United States Patent
McConnell et al.

(10) Patent No.: US 9,103,116 B2
(45) Date of Patent: Aug. 11, 2015

(54) EXTENDABLE SLEEVE FOR POURED CONCRETE DECK

(71) Applicant: Securus, Inc., San Diego, CA (US)

(72) Inventors: Timothy M. McConnell, San Deigo, CA (US); Virgil O'Neil, San Diego, CA (US); Larry D. Brown, San Diego, CA (US); Dennis L. Hart, Incline Village, NV (US)

(73) Assignee: Securus, Inc., San Diego, CA (US)

( * ) Notice: Subject to any disclaimer, the term of this patent is extended or adjusted under 35 U.S.C. 154(b) by 0 days.

(21) Appl. No.: 14/177,125

(22) Filed: Feb. 10, 2014

(65) Prior Publication Data

US 2015/0121783 A1    May 7, 2015

Related U.S. Application Data

(63) Continuation-in-part of application No. 14/072,650, filed on Nov. 5, 2013.

(51) Int. Cl.
*E04C 2/52* (2006.01)
*E04B 1/94* (2006.01)
(Continued)

(52) U.S. Cl.
CPC ............. *E04B 1/941* (2013.01); *A62C 2/065* (2013.01); *E04B 1/946* (2013.01); *E04B 1/947* (2013.01); *E04B 5/48* (2013.01); *E04F 17/08* (2013.01); *F16L 5/04* (2013.01); *F16L 5/10* (2013.01); *H02G 3/0412* (2013.01)

(58) Field of Classification Search
CPC .............. F16L 5/04; F16L 5/10; E04B 5/48; E04B 1/941; E04B 1/947; E04F 17/08
USPC .......... 52/220.8, 576; 249/39, 43, 63, 64, 142, 249/152, 175, 177
See application file for complete search history.

(56) References Cited

U.S. PATENT DOCUMENTS

| 879,370 A | 2/1908 | Dennison |
| 964,394 A | 7/1910 | Coddington |

(Continued)

FOREIGN PATENT DOCUMENTS

| CA | 2174199 | 12/1996 |
| CA | 2411094 | 5/2003 |

(Continued)

OTHER PUBLICATIONS

U.S. Appl. No. 13/840,003, filed Mar. 15, 2013, for a Extendable Sleeve for a Poured Concrete Deck, First named inventor Timothy M. McConnell, Assigned to Securus, Inc.

(Continued)

*Primary Examiner* — Basil Katcheves
*Assistant Examiner* — Joshua Ihezie
(74) *Attorney, Agent, or Firm* — Stetina Brunda Garred & Brucker; Lowell Anderson

(57) ABSTRACT

A tubular passage for poured concrete decks has an intumescent tube held in a two-part, clamshell base. First and second, spaced apart, funnel shaped, diaphragm seals are connected to a first tubular passage or an adjustable length tubular extension. A cap for closing either tube has an inclined outer surface to form a beveled entrance to the passage in the concrete. An aerator box may be connected to the base. Hinged ends on the base allow the shape and length of support to be altered.

16 Claims, 36 Drawing Sheets

(51) Int. Cl.
*A62C 2/06* (2006.01)
*H02G 3/04* (2006.01)
*F16L 5/04* (2006.01)
*F16L 5/10* (2006.01)
*E04B 5/48* (2006.01)
*E04F 17/08* (2006.01)

(56) References Cited

U.S. PATENT DOCUMENTS

| | | | |
|---|---|---|---|
| 2,098,389 A | 11/1937 | Hutchison | |
| 2,684,518 A | 5/1951 | Whitlock | |
| 2,728,126 A | 12/1955 | Whitlock | |
| 3,346,230 A | 10/1967 | Tolf, Jr. | |
| 3,933,336 A | 1/1976 | Tolf, Jr. | |
| 4,091,231 A | 5/1978 | Sotolongo | |
| 4,365,784 A * | 12/1982 | De Stasio | 249/139 |
| 4,596,340 A | 6/1986 | Luther | |
| 4,623,170 A | 11/1986 | Cornwall | |
| 4,663,204 A | 5/1987 | Langham | |
| 5,103,609 A | 4/1992 | Thoreson et al. | |
| 5,156,755 A | 10/1992 | Cass | |
| 5,174,077 A | 12/1992 | Murota | |
| 5,456,050 A | 10/1995 | Ward | |
| 5,681,640 A | 10/1997 | Kiser | |
| 5,834,535 A | 11/1998 | Abu-Isa et al. | |
| 6,004,651 A | 12/1999 | Von Montgelas et al. | |
| 6,168,738 B1 | 1/2001 | Douchet et al. | |
| 6,176,052 B1 | 1/2001 | Takahashi | |
| 6,226,939 B1 | 5/2001 | Atkins et al. | |
| 6,645,278 B2 | 11/2003 | Langille et al. | |
| 6,694,684 B2 | 2/2004 | Radke et al. | |
| 6,790,893 B2 | 9/2004 | Nguyen et al. | |
| 6,862,852 B1 | 3/2005 | Beele | |
| 7,080,486 B2 * | 7/2006 | Radke et al. | 52/98 |
| 7,465,888 B2 * | 12/2008 | Fischer et al. | 174/655 |
| 7,877,941 B2 * | 2/2011 | Fischer et al. | 52/220.8 |
| 8,146,305 B2 | 4/2012 | Cordts | |
| 8,689,503 B2 * | 4/2014 | Fischer et al. | 52/220.8 |
| 8,707,641 B2 | 4/2014 | Rummelhoff | |
| 2003/0009961 A1 * | 1/2003 | Radke et al. | 52/220.1 |
| 2003/0105188 A1 | 6/2003 | Nguyen et al. | |
| 2004/0016190 A1 * | 1/2004 | Radke et al. | 52/232 |
| 2004/0104498 A1 | 6/2004 | Schneider | |
| 2005/0022868 A1 | 2/2005 | Truss | |
| 2006/0160927 A1 | 7/2006 | Surplice et al. | |
| 2008/0014398 A1 | 1/2008 | Tueshaus et al. | |
| 2008/0190505 A1 | 8/2008 | Concon et al. | |
| 2008/0191102 A1 | 8/2008 | Condon et al. | |
| 2011/0036038 A1 * | 2/2011 | von Rummelhoff | 52/577 |
| 2001/0237711 | 9/2011 | Herman et al. | |
| 2012/0022201 A1 | 1/2012 | Zhvanetskiy et al. | |
| 2012/0216791 A1 | 8/2012 | Munzenberger | |
| 2012/0304979 A1 | 12/2012 | Munzenberger et al. | |
| 2013/0020460 A1 | 1/2013 | von Rummelhoff | |
| 2013/0068487 A1 | 3/2013 | Klein et al. | |

FOREIGN PATENT DOCUMENTS

| | | |
|---|---|---|
| CA | 2411274 | 5/2003 |
| CA | 2637848 A1 | 7/2007 |
| CA | 2743852 | 12/2011 |
| DE | 102008031018 A1 | 7/2009 |
| DE | 102011105575 B3 | 9/2012 |
| EP | 0151328 B1 | 6/1988 |
| EP | 0178063 B1 | 1/1989 |
| EP | 0271487 A4 | 3/1989 |
| EP | 0353360 A1 | 2/1990 |
| EP | 0486299 A1 | 5/1992 |
| EP | 0839969 A1 | 5/1998 |
| EP | 0761755 B1 | 4/1999 |
| EP | 0635088 B1 | 10/2000 |
| EP | 1273841 A1 | 1/2003 |
| EP | 1234012 B1 | 2/2008 |
| FR | 2559529 A1 | 8/1985 |
| GB | 2195249 A | 4/1988 |
| GB | 2471929 A | 1/2011 |
| JP | 2004313393 A | 11/2004 |
| WO | 9119540 | 12/1991 |
| WO | 0134724 A1 | 5/2001 |
| WO | 2003000823 A1 | 1/2003 |
| WO | 2007082364 A1 | 7/2007 |

OTHER PUBLICATIONS

U.S. Appl. No. 14/072,650, filed Nov. 5, 2013, for a Extendable Sleeve for a Poured Concrete Deck, First named inventor Timothy M. McConnell, Assigned to Securus, Inc.

* cited by examiner

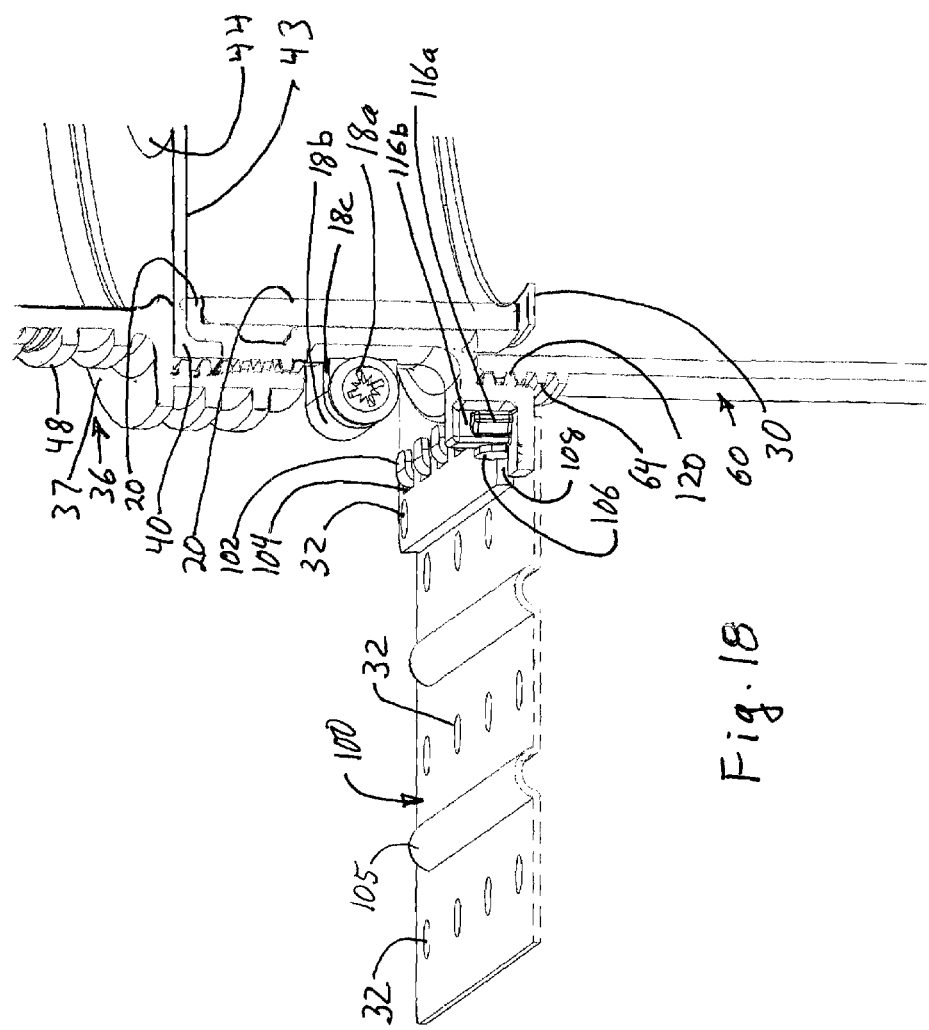

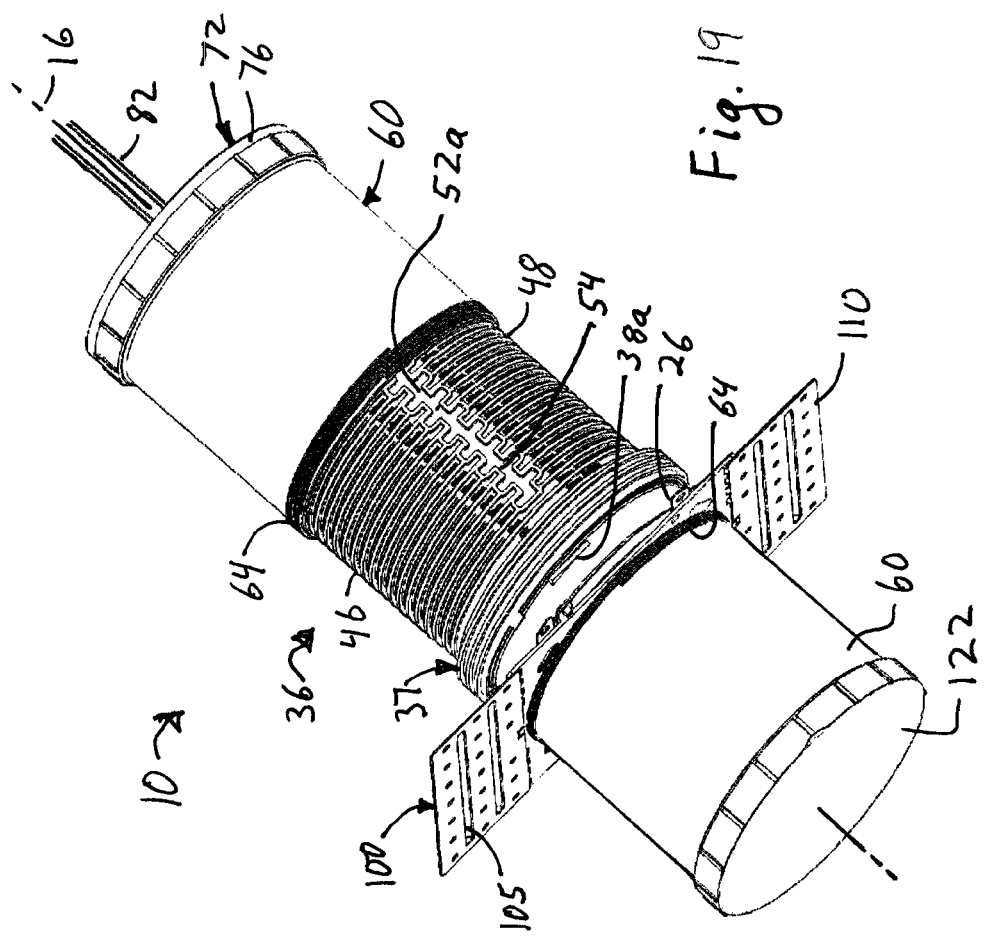

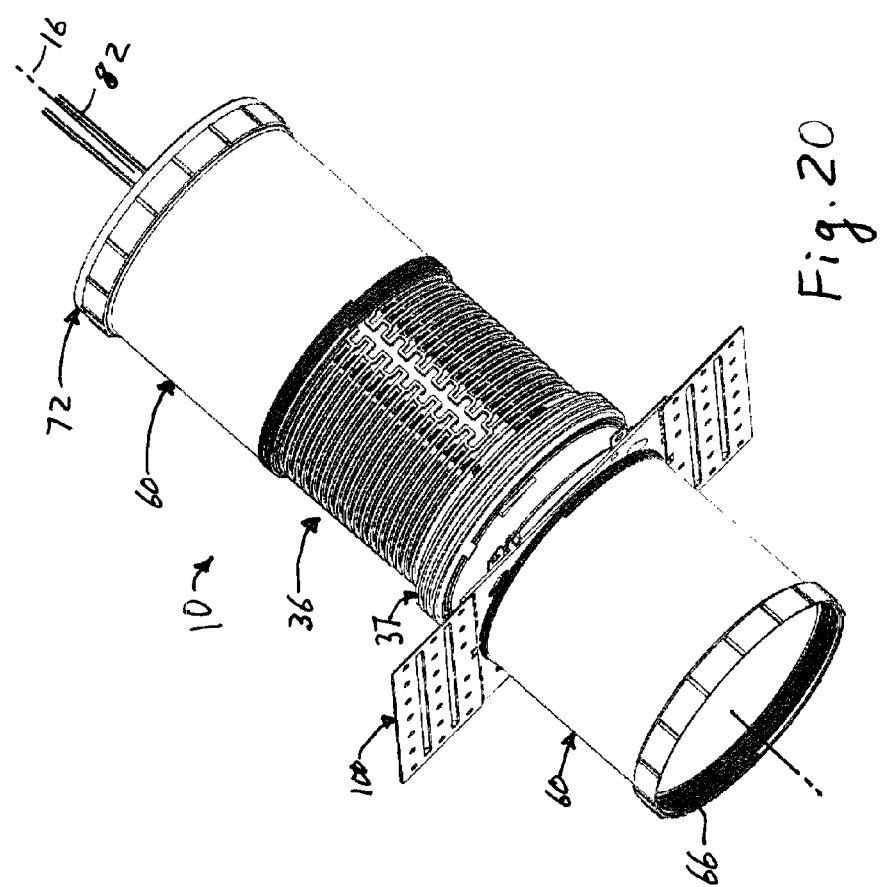

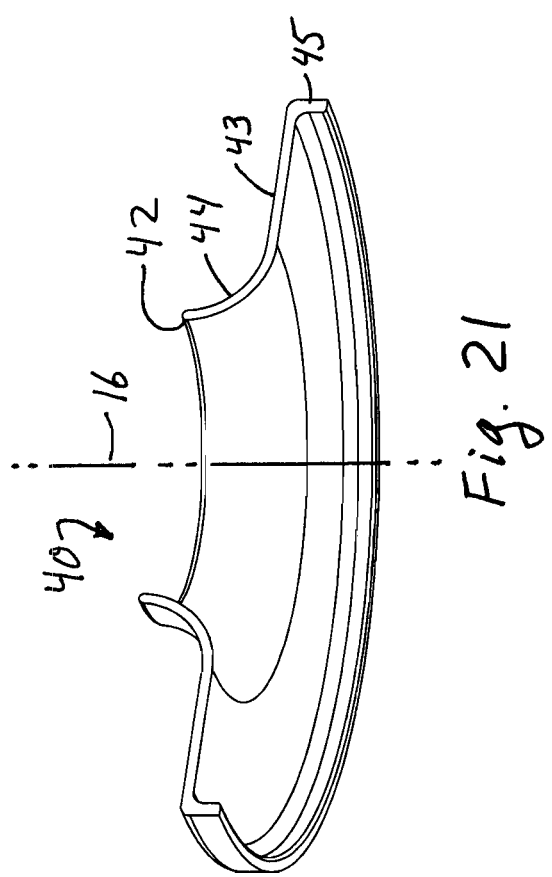

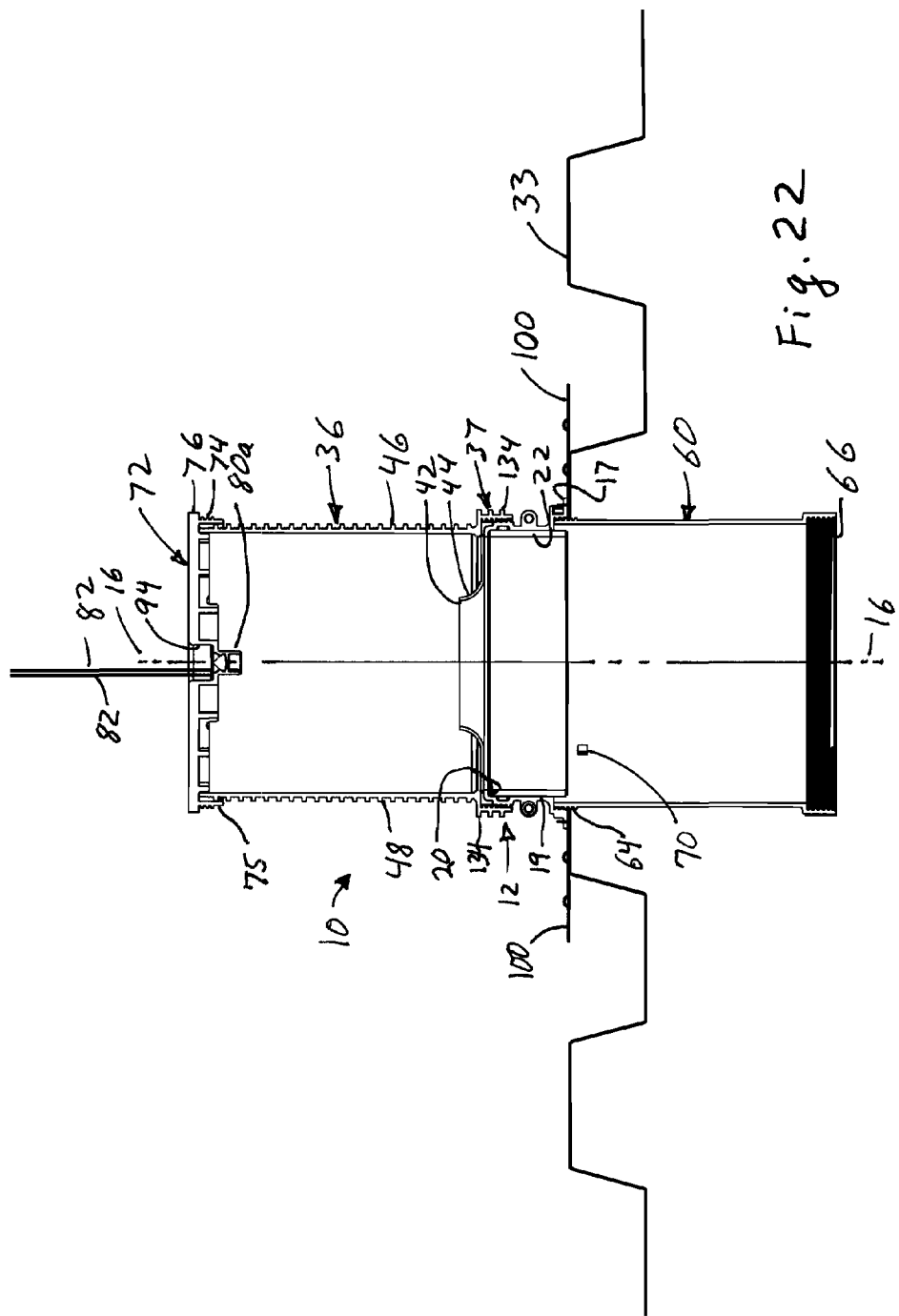

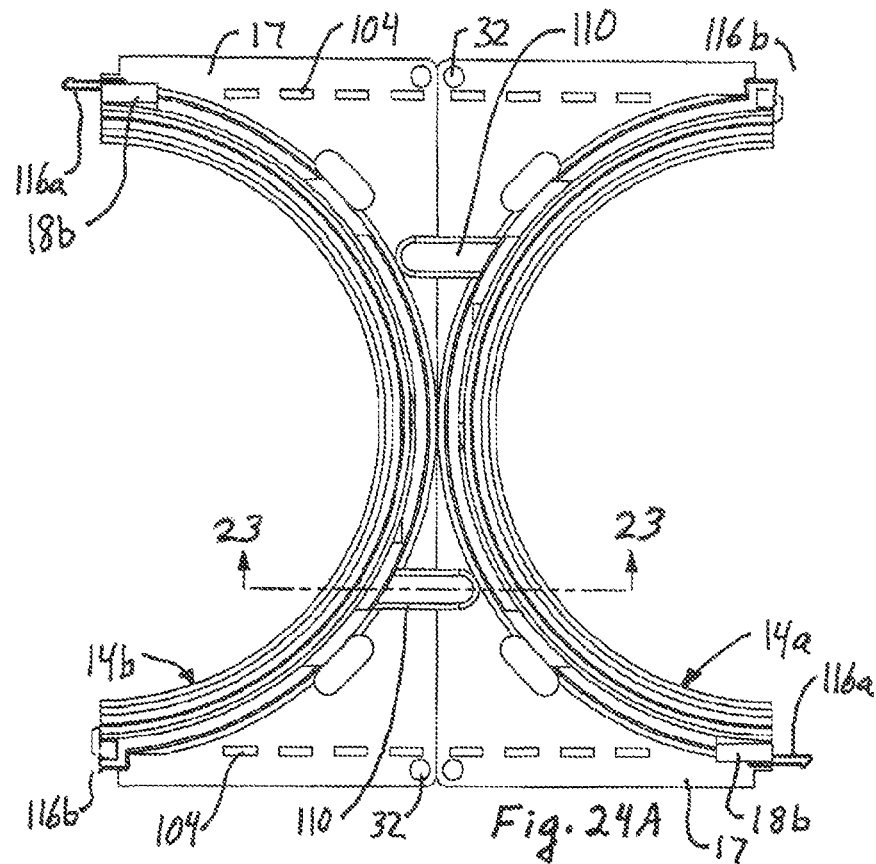
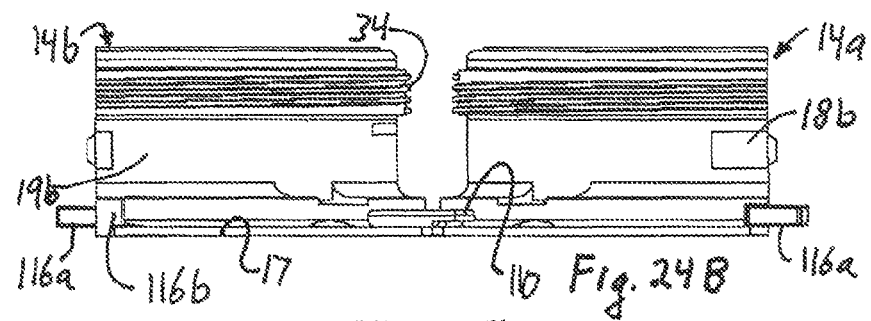
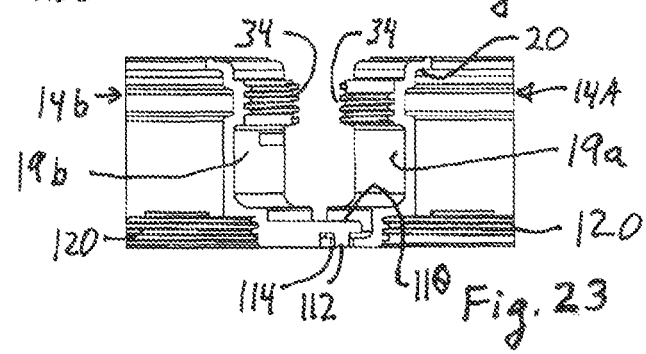

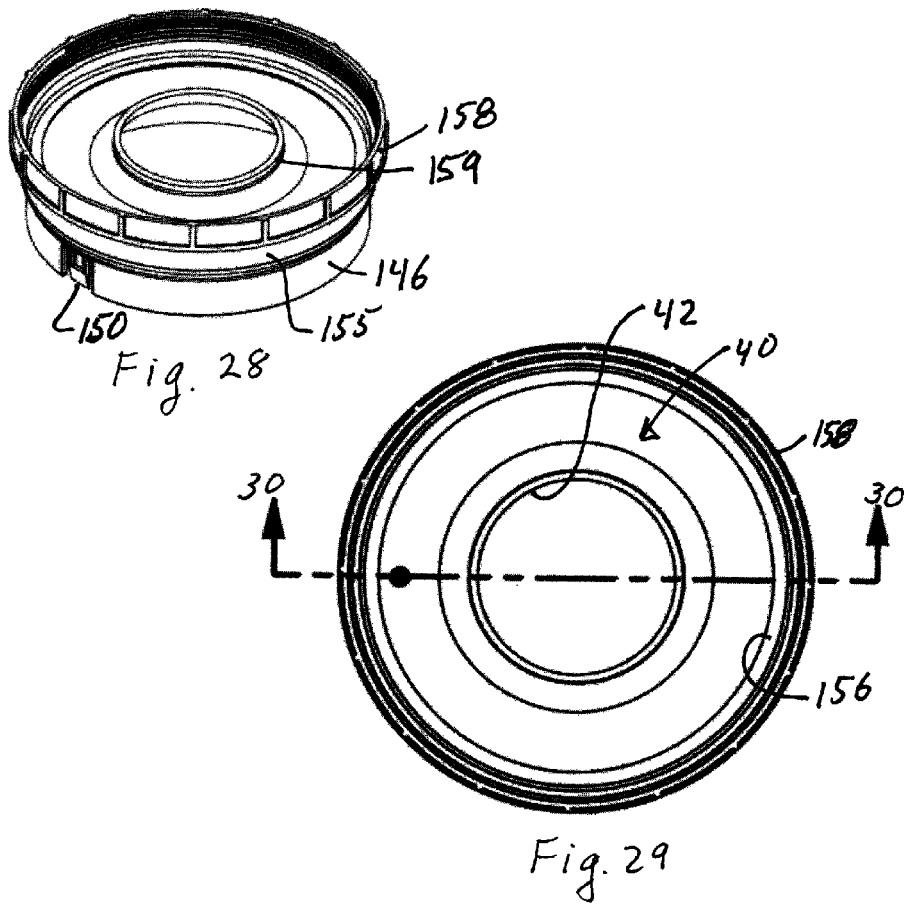
Fig. 28
Fig. 29
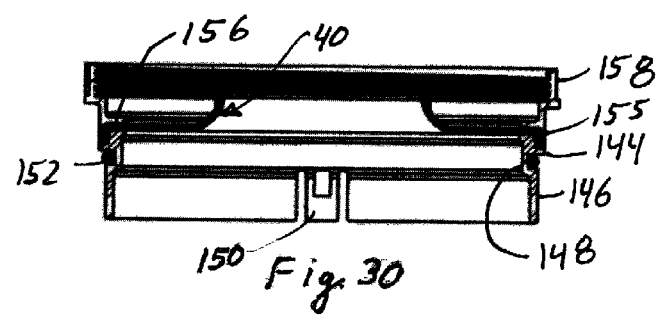
Fig. 30

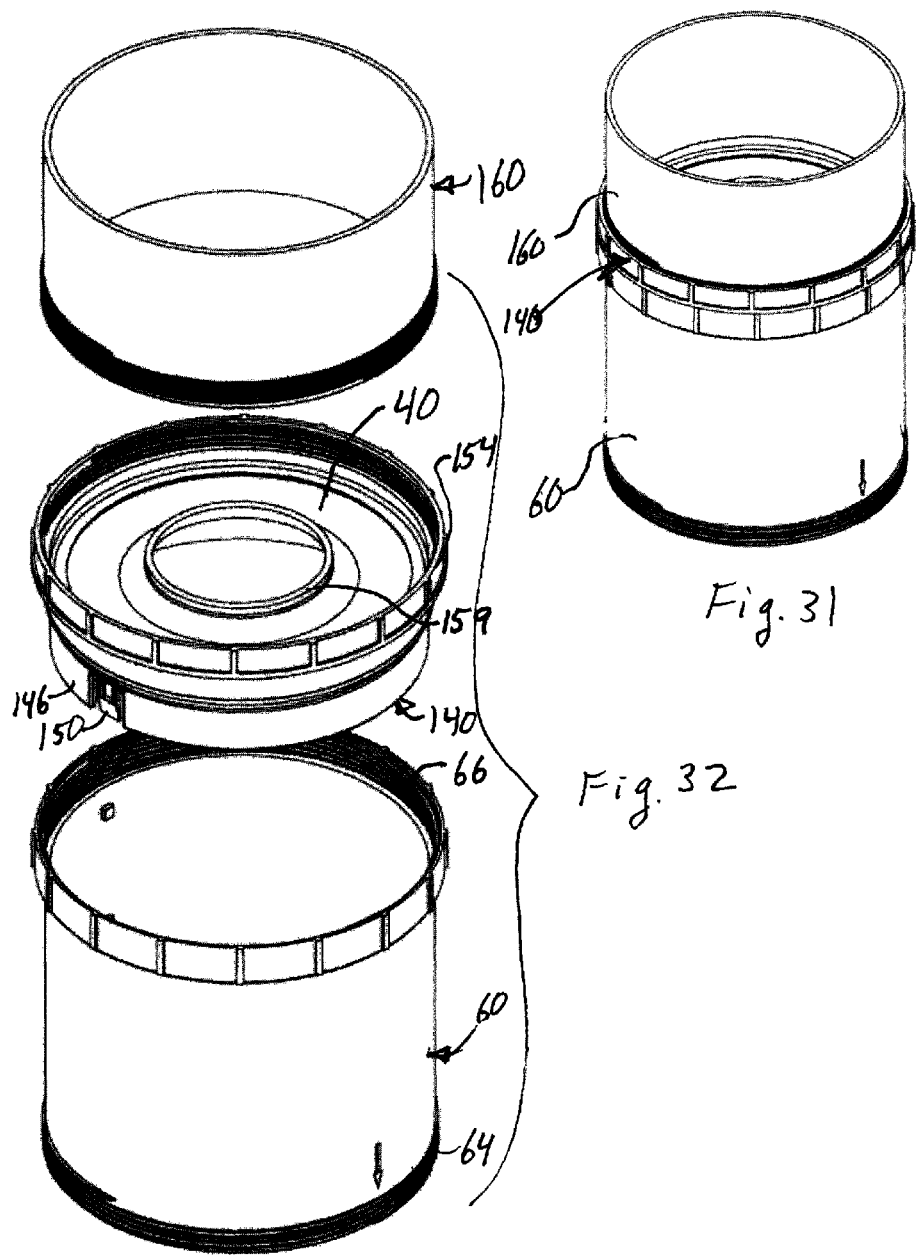

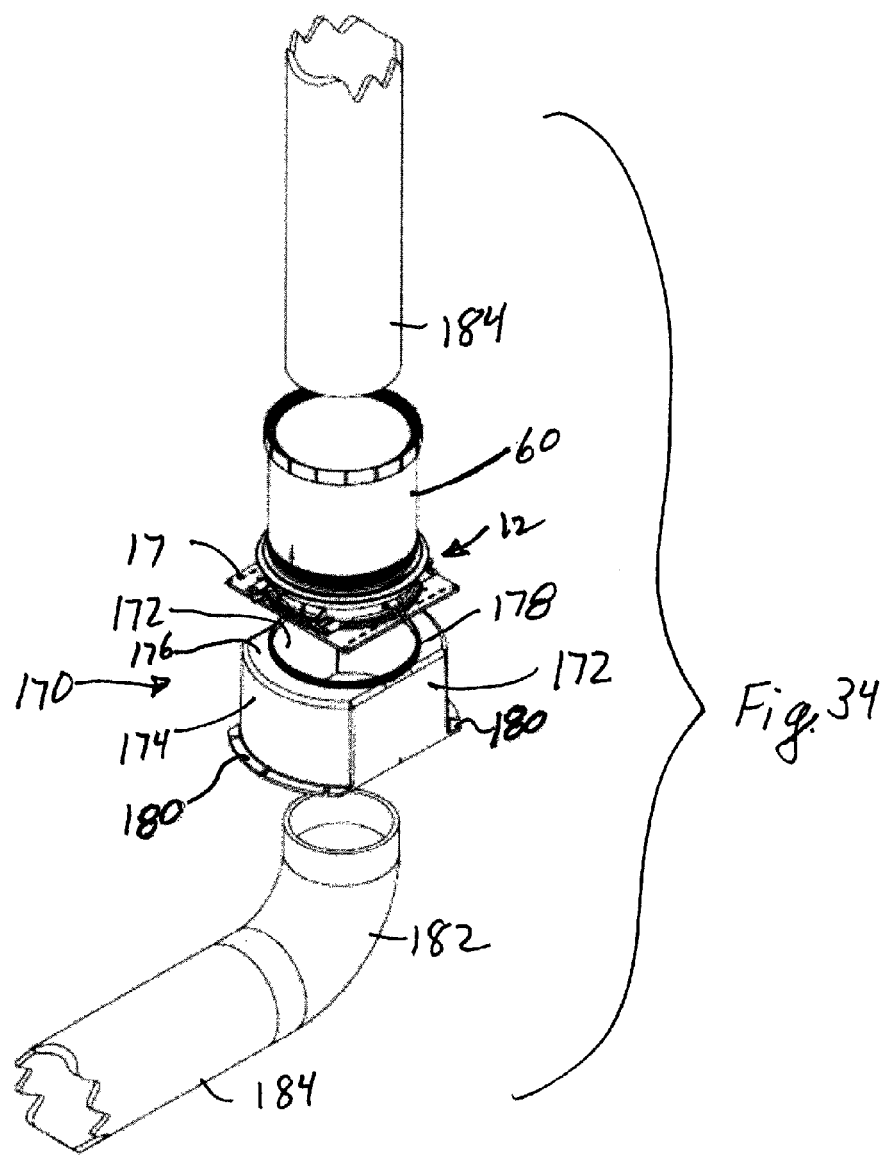

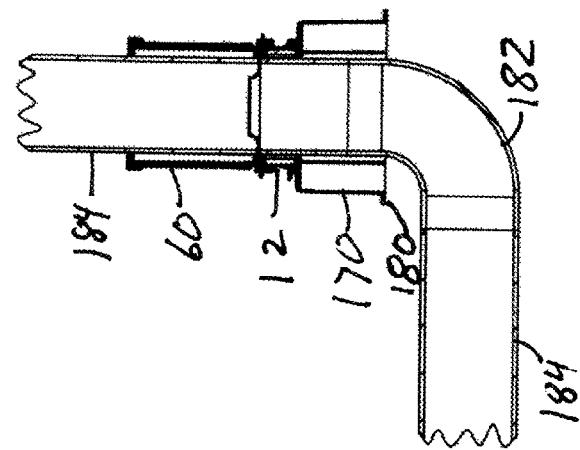
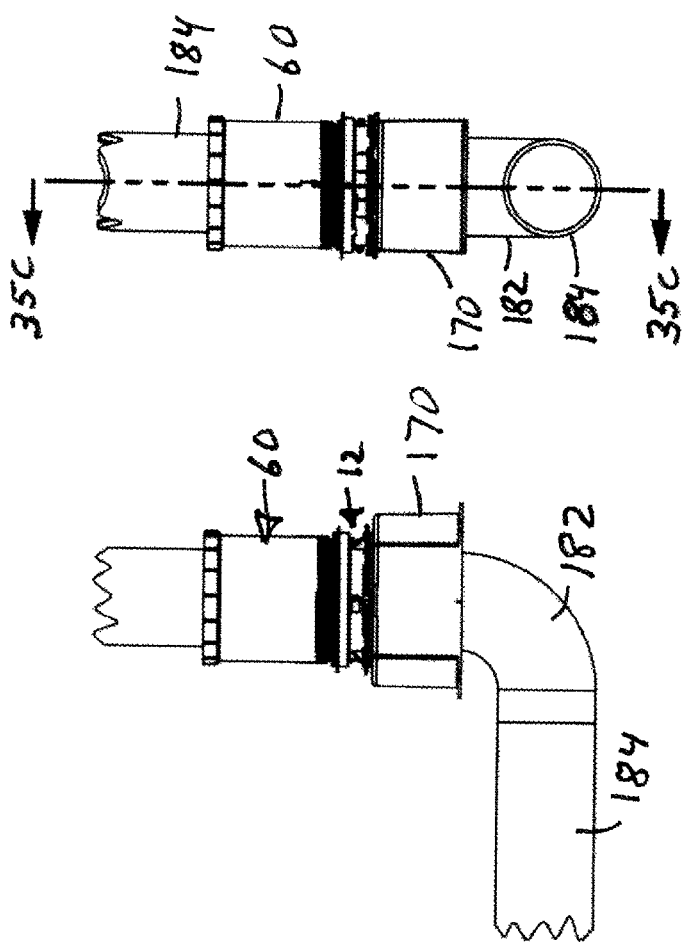
Fig. 35c
Fig. 35b
Fig. 35a

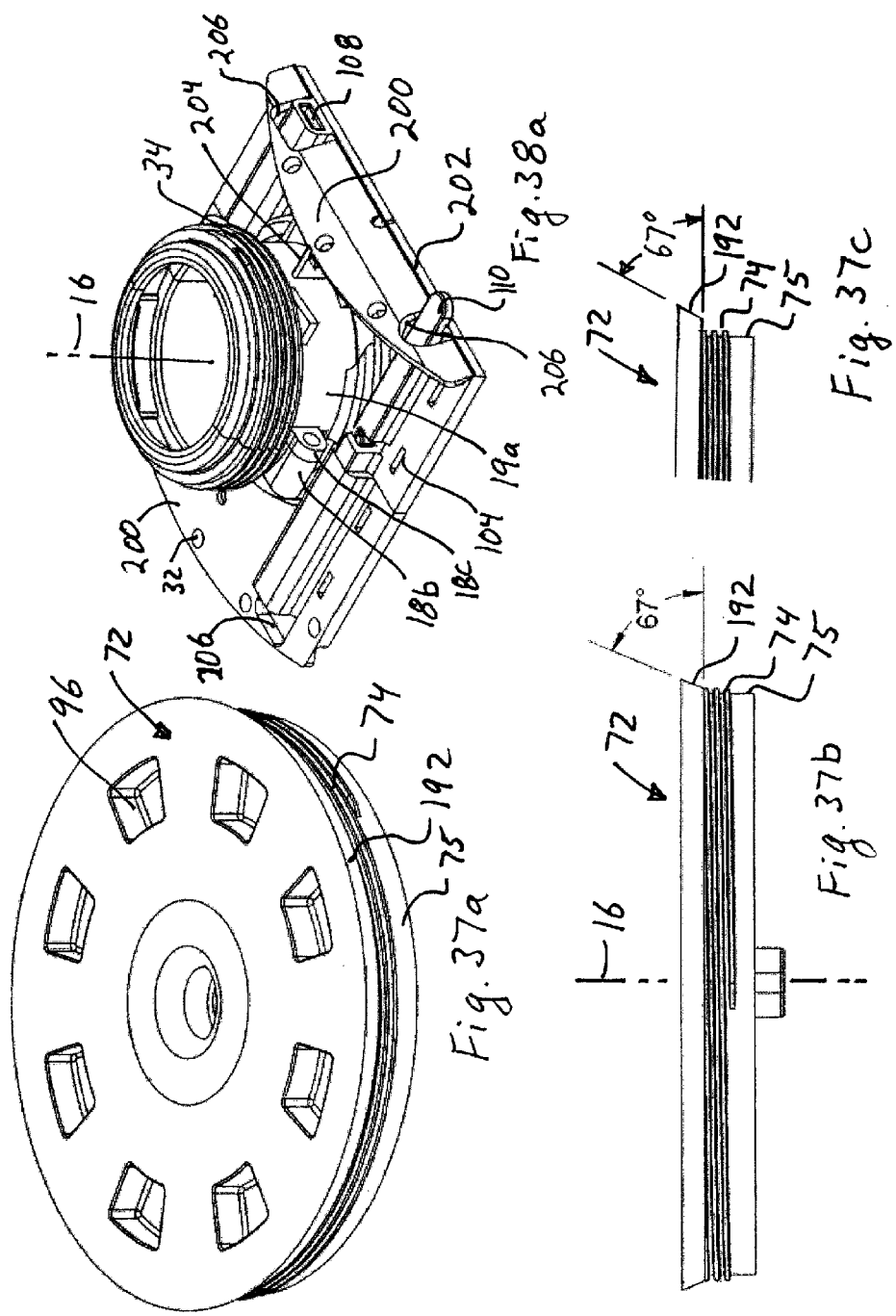

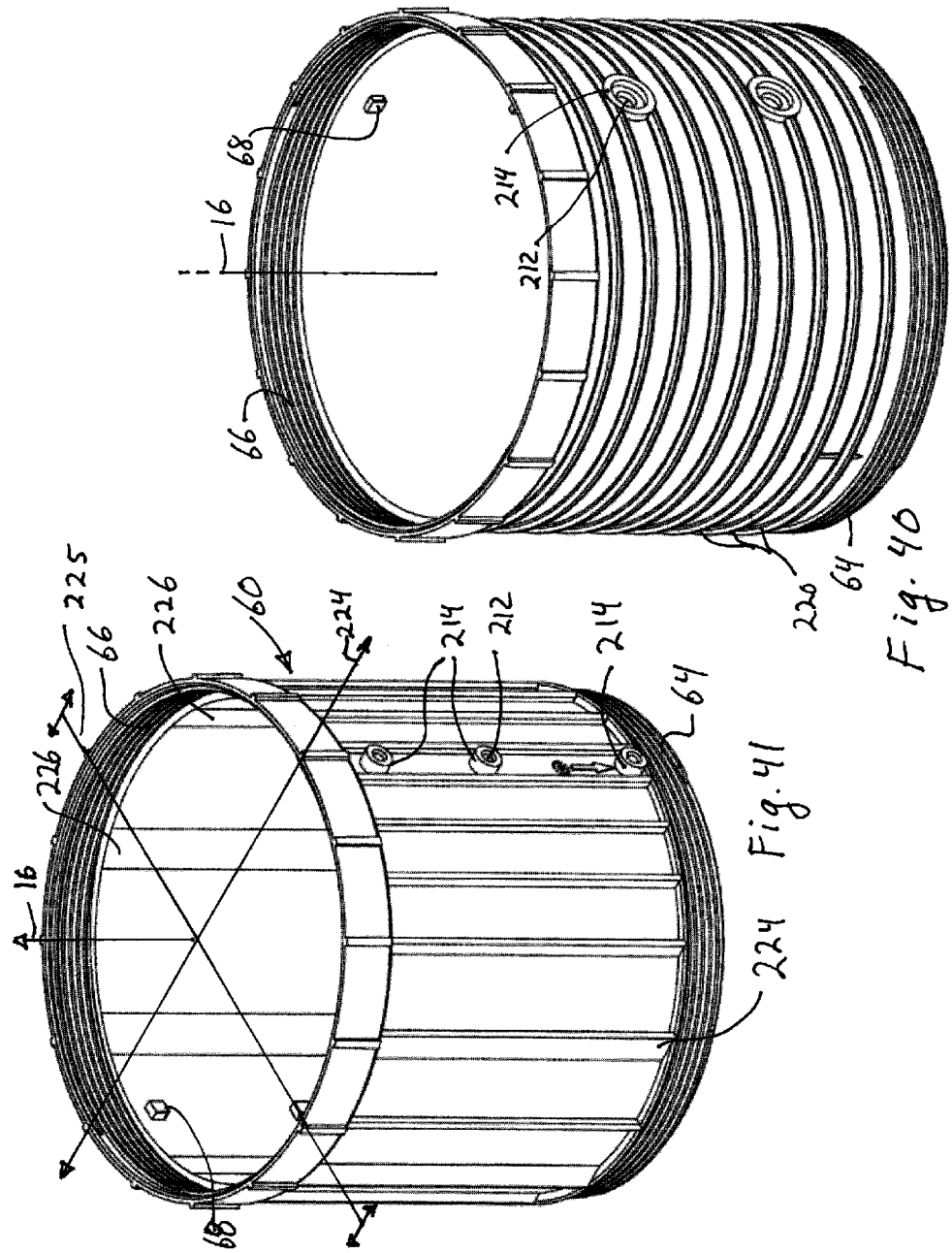

EXTENDABLE SLEEVE FOR POURED CONCRETE DECK

CROSS-REFERENCE TO RELATED APPLICATIONS

This application is a continuation in part of application Ser. No. 14/072,650, titled Extendable Sleeve for Poured Concrete Deck, filed Nov. 5, 2013, the complete contents of which are hereby incorporated by reference.

STATEMENT RE: FEDERALLY SPONSORED RESEARCH/DEVELOPMENT

Not Applicable

BACKGROUND

Concrete floors in multistory buildings are poured onto flat plywood decks that are later removed, or poured onto corrugated sheet metal supports that are left in place. In both cases passages through the concrete decks are needed for various plumbing pipes, electrical conduits, ventilation tubes, etc. In the event of fire or flooding, these passages through the concrete must be sealed in order to prevent passage of air, smoke, fire or water. Current fire and smoke seals use an intumescent material that involves taking flat strips of intumescent material and fastening it around a cylindrical container of predetermined diameter using adhesives or other mechanical fasteners. The intumescent material often includes a graphite or fibrous material that can be messy and hazardous to handle and ingest, and often carcinogenic. Fastening the flat strips to the passage tubes is labor intensive, prone to errors and may raise health concerns. Because the intumescent material has a limited expansion, and because many applications require effective internal smoke and water sealing, the containers are generally made to order for specific pipe sizes. Further, because of the variable thickness of concrete slabs specified by builder contractors, manufacturers are forced to either custom build the container hardware or to supply containers in large increments that force customers to buy extra kits or cut the container on-site. In any event, current options do not allow economically effective manufacturing-to-specification solutions. Upon installation, the pipes actually used may differ from those initially planned or may be offset from the center more than the expansion of the intumescent material can accommodate, so the prefabricated, size specific fire seals may not fit, or fit as well as intended or needed, or may not work as well as designed during actual use. There is thus a need for an improved fire seal and container for intumescent material that will accommodate a wider variety of pipe diameters within a single device be more easily assembled and installed, and better suit variations in pipe location and slab thickness than devices currently used.

The passages through the concrete are formed by fastening a passage tube, typically plastic or metal to the support before the concrete is poured. The concrete decks vary greatly in thickness from four to eight inches, but may be as thin as two inches and as thick as 18 inches or more. Current passage tubes are premade to specific diameters and lengths, making it difficult to stock a sufficient supply for use and to accommodate variations in the passage tubes at the job site. There is thus a need for a more flexible length passage tube able to accommodate pipes of varying diameters.

The tubes must be fastened to the plywood support, or have a larger base to span enough corrugations to provide a stable tube support, especially for smaller diameter, longer passage tubes. Providing a large base suitable for corrugated supports is expensive and unnecessary for plywood supports. Moreover, several pipes may sometimes be clustered together when passing through the floor and in such cases the individual passage tubes need to be placed close together at distances driven by CISPI standards. If the passage tube has a large base for use on a corrugated support, it becomes difficult to achieve the desired spacing when the large support is used on either plywood or corrugated supports. There is thus a need for an improved tube support more suitable for the different support applications.

The passage tubes are provided in different lengths to accommodate the variable thickness of the concrete decks. Long passage tubes are sometimes cut shorter, wasting material and often resulting in inaccurate cuts as the worker may measure wrong. Sometimes an extension can be added to a shorter passage tube to increase the overall length, but again workers can measure wrong, resulting in non-compliant passages through the concrete. Also, the extended tubes may be hit, kicked or stood on and in such cases extension tubes may break. There is thus a need for an improved passage tube with a sturdier, easily adjusted length.

In addition to a smoke and fire seal the passages through the concrete must provide a water seal around the pipes or conduits passing through the passage tube. Flat, plastic or rubber sheets are used with holes cut out for the pipe to pass through and these are also installed in the passage tube at the time the passage tubes are made. If the pipes are too large for the holes the sheets tear, if the pipes are too small the seal is poor and if the pipes are offset from the holes in the sheets then inadequate seals may formed. There is thus a need for an improved water seal in passage tubes.

When the concrete deck is poured around the passage tubes the upper end of the tubes are blocked to prevent concrete from filling the passage tube. Mechanical trowels and riding trowels are used to finish the concrete surfaces of the poured decks and the closed ends of the tubes are often covered with a thin layer of concrete in doing so. The concrete covering makes it difficult to locate the passage tubes. Workers sometimes tape nylon strands to items over which concrete is poured so the strands extend out of the concrete surface after finishing and bend for the troweling machines. But taping strands to things is time consuming, may be unintentionally omitted or not planned at all, and the tape may tear lose or otherwise fail to restrain the strands during pouring of the concrete or troweling. There is thus a need for an improved way to locate passage tubes in freshly poured concrete floors.

The passage tubes may need to be configured differently depending on whether they are to contain metal or cast iron pipes or plastic pipes, in part because the water seal with the outside of a cast iron pipe has different requirements than for plastic or copper pipes. For example, exterior pipe diameters differ significantly between pipe types of even the same nominal internal size. Workers can sometimes look inside the passage tube to see the opening size in the water seal but that is time consuming, and invites error from judging opening diameters by visually looking down a dark tube of varying length. There is thus a need for an improved way to allow workers to identify the types of pipes a passage tube is designed to accommodate.

After concrete floors are poured to entrain passage tubes there may be spills of large volumes of water. It is desirable to prevent such water spills from entering the passages and passing through the passages. There is thus a need for an improved passage tube for entrainment in concrete floors.

BRIEF SUMMARY

An assembly is provided to form an adjustable length, tubular passage in poured concrete decks. The assembly has a tubular cylinder of intumescent material held in a two-part base by a clip supporting the bottom of the tubular cylinder of intumescent material and fastened to the base. A first, cylindrical tube engages the base's top to clamp a diaphragm seal against the base. The seal has a pipe opening and a funnel shape to accommodate pipe offsets and to better seal against the pipe. The first tube has spaced, radially extending, parallel ridges at predetermined distances from the base. Cutting between the ridges adjusts the length of the tubular passage to known lengths. Longitudinal channels separate the ridges into first and second sets of ridges. Printed indicia in the channels or in the grooves between adjacent ridges can state the lengths. The two sets of ridges can be at different distances from the base for greater variability of length adjustment. A cylindrical extension tube fits over the first tube and has inwardly extending lugs on opposing sides of a first end of the extension tube. The lugs pass along the longitudinal channels with the extension tube being rotated to engage the lugs with various ridges to adjustably fix the passage length to the end of the extension tube. A second end of the extension tube optionally engages the base bottom for use with corrugated supports. A cap with repositionable locating filaments optionally closes the either the first extension tube or the first tube, depending on need. The locating filaments are attached to the underside of the cap and extend inside nested first tube and extension tube for shipment, with the filaments being repositioned to connect to the outside of the cap and extend along the longitudinal axis during use. The locating filaments connect to the cap below the outer surface so the filaments bend during troweling of the concrete and extend above the finished concrete surface to allow users to locate the tubular passage after concrete finishing.

In more detail, there is advantageously provided a tubular passage assembly for poured concrete decks formed on a support surface. The assembly includes a base having a cylindrical sidewall with an upper end and an opposing bottom end and extending along a longitudinal axis. The upper end of the sidewall has an inward extending upper flange defining a circular opening encircling the longitudinal axis. The lower end of the base has an outward extending base flange to support the base on the support surface during use. A cylindrical tube of intumescent material encircles the longitudinal axis and fits inside and adjacent to the sidewall and is restrained from movement in a first direction along the longitudinal axis by the upper flange. A retaining clip has an annular portion abutting the bottom of the tubular cylinder of intumescent material to restrain the tubular cylinder of intumescent material from movement in a second direction along the longitudinal axis. The retaining clip has a plurality of tabs extending through the base sidewall to restrain movement of the retaining clip along the longitudinal axis during use.

In addition to the base assembly, the tubular passage assembly may include a flexible diaphragm seal having an outer periphery engaging an upper end of the base and having an inner periphery defining an opening encircling the longitudinal axis during use. A portion of the diaphragm adjacent the inner periphery has a funnel shape extending out of a plane orthogonal to the longitudinal axis through the outer periphery.

In further variations, the first tube has opposing upper and lower ends with the lower end configured to engage the base. The first tube also may have an inward extending flange adjacent the lower end configured to engage the periphery of the diaphragm and press it against the base to form a fluid tight seal when the first tube is engaged with the base. The first tube may further includes a first set of parallel ridges extending outward from the first tube with each of the first ridges in a plane orthogonal to the longitudinal axis and the first set of ridges each extending less than half way around the first tube. The first tube may also include a second set of parallel ridges extending outward from the first tube with each of the ridges in a plane orthogonal to the longitudinal axis. The second set of ridges each extends less than half way around the first tube and located on an opposing side of the first tube than the first set of ridges. The first and second ridges each have ends spaced apart to define first and second longitudinal channels on opposing sides of the first tube. The first tube may further include a first set of visible indicia adjacent a plurality of the first set of ridges where the indicia defines a distance from the bottom of the base to the visible indicia associated with each of the plurality of the first set of ridges. The first tube may also have a second set of visible indicial adjacent a plurality of the second set of ridges defining a distance from the bottom of the base to the visible indicia associated with each of the plurality of the second set of ridges, with at least one of the first and second set of indicia indicating a distance specified in metric or English distance units.

In further variations, a plurality of the ends of two adjacent ridges in the first set of ridges are joined by first axially extending end segments with the first axially extending end segments joining only two adjacent ridges. A plurality of second axially extending end segments may join adjacent ridges which ridges are each joined to a different one of the first axially extending end segments. The first axially extending end segments are located a first circumferential distance from a center of the first channel and the second axially extending end segments located a second circumferential distance from the center of the first channel with the second circumferential distance being greater than the first circumferential distance to form a first circumferential recess at each second axially extending end segment. Further, a plurality of the ends of two adjacent ridges in the second set of ridges may be joined by third axially extending end segments with the third axially extending end segments joining only two adjacent ridges. A plurality of fourth axially extending end segments may join adjacent ridges which are each joined to a different one of the third axially extending end segments. The third axially extending end segments are located a third circumferential distance from the center of the first channel and the fourth axially extending end segments located a fourth circumferential distance from the center of the first channel, with the fourth circumferential distance being greater than the third circumferential distance to form a second circumferential recess at each fourth axially extending end segment.

In still further variations, the base may have an outwardly extending limit stop and the first tube has a tab located to hit the limit stop as the first tube engages the base so as to position the first tube a known distance from a bottom of the base and ensure proper compression of the diaphragm seal. Further, the base may have external screw threads threadingly engaging internal screw threads on the lower end of the first tube to engage the first tube to the base, with the base and first tube each having a motion limit stop located to engage when the first tube is at a predetermined distance from the bottom of the base. Further, the base may be formed of two segments separated along a plane through the longitudinal axis but fastened together to form the base after the tubular cylinder of intumescent material is inserted into at least one segment of the base.

In still further variations, the tubular passage assembly may include a first extension tube having opposing top and bottom ends with the top end threaded internally and the bottom end threaded externally with the same threads as the top end. The bottom end of the first extension tube has first and second locking lugs each extending inward from a different opposing side of the first extension tube with the first and second locking lugs being sized and located to slide along the first and second channels, respectively. Rotation of the first extension tube places each locking lug between two adjacent ridges of one of the first or second sets of ridges. Further, the upper end of the first extension tube may have internal threads sized to threadingly engage external threads on the cap with the first extension tube being large enough to fit over the first tube. This first extension tube may also act as a lower extension in cooperation with threads formed in the base located to threadingly engage threads on one end of the extension tube. Still further, additional extension tubes may be threaded into the first extension tube if needed, to further lengthen the tube.

In further variations, the flexible diaphragm is made of silicone or TPR (thermo plastic rubber) and has sidewalls curving upward away from the base and toward the longitudinal axis, with the curved sidewalls located intermediate the inner and outer periphery. The base flange may extend along at least two opposing sides of the base and may further include a first stabilizing plate configured to releasably fasten to one of the at least two opposing sides of the base flange and restrain rotation of the upper end of the base toward the juncture of the base flange with the stabilizing plate. A second stabilizing plate may be provided on an opposite side of the base flange. Further, the stabilizing plate(s) may be joined to the flange by a living hinge and screwed or nailed to the concrete forms for stabilizing purposes, or rotated along the living hinge toward the flexible diaphragm and latched there to keep the plate out of the way if not being used to stabilize the base.

An improved cap is also provided for use with the tubular passage assembly. The cap has a circular top having an upper and lower side with an annular skirt depending therefrom. First and second latches each extend inward from an opposing side of the skirt. The latches are configured to releasably engage one of the ridges on the outside of the first tube in order to fasten the cap to the first tube. Also, the cap may have external threads for attaching to the first extension tube. Between the threads and the top of the cap, the cap may have an inwardly tapered peripheral edge that forms a short, conical or beveled edge in the concrete when the cap is removed. The cap has a connector on at least the upper side of the top with the connector located in a recess. A filament base has at least one filament extending therefrom and is configured to releasably engage the connector to hold the at least one filament generally parallel to the longitudinal axis. The juncture of the filament to the filament base being located below the upper side of the top and sufficiently far from the recess edge so that the at least one filament can be troweled against the upper side of the top and not break, the filament having a length sufficient to be visible after the cap is covered with a thin layer of troweled concrete during use.

There is also provided a kit for forming a tubular passage along a longitudinal axis for passage of a pipe through a poured concrete deck. The kit includes a base assembly having a base formed of two opposing housing portions fastened together to form a cylindrical sidewall portion containing a tubular cylinder of intumescent material adjacent the cylindrical sidewall portion. The tubular cylinder of intumescent material encircles the longitudinal axis and has its motion limited in a first direction along the axis by the housing and has movement in the opposing direction along the axis limited by a clip engaging the housing. The kit may include a first flexible diaphragm seal having a central opening selected to seal against a range of pipe diameters during use. The seal has a funnel portion between an outer periphery and the central opening. The kit may also include a first cylindrical tube configured to fasten to a top of the base assembly during use and encircle the longitudinal axis during use. The first tube and base are configured to clamp a periphery of the flexible diaphragm between them sufficiently to form a fluid tight seal.

In further variations, the first tube of the kit has a plurality of outwardly extending, equally spaced ridges on an exterior surface thereof and extending along a majority of a length of the first tube. The kit also may include a first cylindrical extension tube having a first end configured to fit over the first tube and having at least one lug configured to engage a selected one of the plurality of outwardly extending ridges to releasably fasten the first extension tube to the first tube. The kit may further include a first tube that fastens to the top of the base by a double lead threaded connection. The base may have internal, double lead threads on a bottom thereof which threads encircle a lower portion of the tubular cylinder of intumescent material and are configured to threadingly engage mating threads on the first cylindrical extension tube. The kit may also include a second flexible diaphragm seal clamped between two opposing rings may also be provided, with at least one of the rings having threads or snap locks configured to connect to the housing or to the first tube.

The first tube may also form a separate improvement. The first tube may form a tubular passage along a longitudinal axis for passage of a pipe through a poured concrete deck. The first tube may include a tubular cylinder having an opposing upper and lower ends extending along the longitudinal axis during use. The cylinder has a first diameter along a majority of its length with a larger diameter lower end and internal threads around the inside of the larger diameter lower end. The cylinder may have a first plurality of parallel ridges extending radially outward along a majority of a length of the cylinder and a second plurality of parallel ridges extending radially outward along a majority of a length of the cylinder and axially offset from the first set of ridges. The first and second sets of ridges are preferably separated by first and second channels extending parallel to the longitudinal axis. In further variations, a plurality of the ridges in the first set has distal ends joined by vertical segments at the distal ends of said plurality of ridges.

In the above tubular passages and kits, for use on corrugated supports, a hole is cut through the corrugation and the base positioned over the hole. An extension tube the same as the first extension tube is passed upward through the hole in the corrugation and fastened to the bottom of the base. The extension tube may have one or more pilot holes extending inward from an outer surface of the extension tube, with the pilot holes preferably being blind holes but located so the hole is aligned between adjacent ridges on the first tube so that a self-threading fastener (also optionally provided with the kit) may pass through the blind hole and between adjacent ridges to fasten the extension tube to the first tube.

Preferably the base has mating screw threads encircling the tubular cylinder of intumescent material and thus outward of that cylinder and accessible from the lower side of the base. To enable the screw threads to extend into the base and encircle the tubular cylinder of intumescent material the retaining clip is offset so that the tabs bend upward to form an offset accommodating the bottom screw threads with the tabs then extending outward through openings in the cylindrical sidewalls of the base that encircle the tubular cylinder of intumescent material. As needed, a removable adhesive cover or cap is placed over the bottom of the base to keep debris from entering the base during shipment, during installation, during pouring of the concrete and during application of fire retardant spray. The removable adhesive cover or cap may be removed and placed on the open end of an extension tube that is screwed into the bottom of the base if desired.

The base flanges may have two removable tabs formed in the base. One tab may indicate metal and the other plastic. If the shaped diaphragm and base assembly are selected for use with metal pipes passing therethrough, then the plastic tab is removed so that a user can see from looking at the tab on the base that the passage tube is intended for use with metal pipes. If the shaped diaphragm is selected for plastic pipes then the metal tab is removed so that a user can see from looking at the tab on the base that the passage tube is intended for use with plastic pipes. The indicia indicating metal or plastic pipe is preferably visible from at least the upper side and preferably visible from both the upper and lower sides of the base. Alternatively, the indicia may consist of color-coded inserts installed in openings in the base flange.

There is also advantageously provided a kit for an assembly forming a tubular passage for poured concrete decks formed on a support surface. The kit and assembly include a base having a cylindrical sidewall with an upper end and an opposing bottom end and extending along a longitudinal axis. The upper end of the sidewall have an inward extending upper flange defining a circular opening while the lower end of the base has an outward extending base flange to support the base on the support surface during use. A tubular cylinder of intumescent material is provided and fits inside and adjacent to the sidewall where it encircles the longitudinal axis and is retained in position along the longitudinal axis during use. Various retaining mechanisms for the intumescent material can be used as described herein, and as known to those skilled in the art. The kit and assembly also include a first flexible diaphragm seal having an outer periphery engaging an upper end of the base and having an inner periphery defining an opening encircling the longitudinal axis during use. A portion of the diaphragm adjacent the inner periphery has a funnel shape extending out of a plane orthogonal to the longitudinal axis through the outer periphery. The kit and assembly may also include a first tube having opposing upper and lower ends with the lower end configured to engage the base. The first tube may have an inward extending flange adjacent the lower end configured to engage the periphery of the diaphragm and press it against the base to form a fluid tight seal when the first tube is engaged with the base. The first tube further includes a first set of parallel ridges extending outward from the first tube with each of the ridges in a plane orthogonal to the longitudinal axis and spaced apart a first distance. The kit and assembly also include a first extension tube having a sidewall with opposing top and bottom ends. The bottom end of the first extension tube has first and second locking lugs each extending inward from a different opposing side of the first extension tube. The first and second locking lugs may be sized and located to slide along the first and second channels, respectively, with rotation of the first extension tube placing each locking lug between two adjacent ridges of the first set of ridges when the first extension tube is centered on the longitudinal axis and overlaps a portion of the first tube. The kit and assembly also may include a pilot hole extending partially through the sidewall from an exterior side of the first extension tube. The pilot hole is located on the extension tube relative to one of the first and second locking lugs so that the pilot hole is located in a radial plane passing between two adjacent first ridges.

In further variations, a self-tapping threaded fastener extends through the pilot hole and wall of the extension tube and into the first tube between two adjacent first ridges to connect the first extension tube to the first tube. There may be two pilot holes on opposing sides of the first extension tube and the kit and assembly may further include two threaded fasteners. Each fastener may extend through a different one of the pilot holes and wall of the extension tube and into the first tube between two adjacent first ridges to connect the first extension tube to the first tube. The first set of ridges preferably extends less than half way around the first tube and the first tube may include a second set of parallel ridges as described herein.

The kit and assembly may also include a second flexible diaphragm seal having a circular periphery located between a connecting ring and a clamping ring and held therebetween. The second diaphragm seal has an inner periphery defining an opening encircling the longitudinal axis during use with a portion of the diaphragm adjacent the inner periphery having a funnel shape extending out of a plane orthogonal to the longitudinal axis through the outer periphery and extending in the same axial direction as the funnel shape of the first diaphragm during use. The connecting ring is configured to engage the upper end of the first tube, preferably by threads or a snap-lock connection. An O-ring seal may be located between an outward facing surface of the connecting ring and an inner surface of the first tube, with the O-ring seal located between the first and second diaphragm seals during use.

The kit and assembly may include a circular top having opposing upper and lower surfaces with a depending skirt and an inclined sidewall located between the depending skirt and the top surface of the cap. The inclined sidewall has a larger diameter adjacent the top surface of the cap and a smaller diameter adjacent the skirt. The inclined sidewall has a diameter larger than an outer diameter of the top end of the first extension tube so as to extend outward of the first extension tube and form a beveled surface in concrete entraining the cap and first extension tube during use when the cap is fastened to the first extension tube. The inclined sidewall has a diameter larger than an outer diameter of the top end of the first tube so as to extend outward of the first tube and form a beveled surface in concrete entraining the cap and first tube during use when the cap is fastened to the first tube during use. The cap may have the other features described herein.

The assembly or kit may also include an aerator box. The aerator box may have two parallel side walls joined at opposing ends to a different one of two opposing end walls to encircle the longitudinal axis and form the sides of an enclosure. The side walls and end walls are connected to a top having a cylindrical flange configured to connect to the bottom of the base. The parallel side walls are spaced apart the same distance as two opposing sides of the base flange. The two opposing end walls are spaced apart a larger distance but less than twice the distance between the parallel side walls. At least some of the end walls and side walls have a lower end with an outwardly extending flange suitable for fastening the aerator box to a concrete pouring form.

The kit and assembly may also include a variation of the base wherein the base flange has two opposing and parallel sides and two opposing ends. Each of the opposing ends has a hinge extending across the end orthogonal to the sides and forming a distal end portion that may rotate about the hinge toward the sidewall of the base. The hinge may be a living hinge formed in a base flange made of a polymer. The hinged distal end of the base flange, the aerator box, the cap with the inclined peripheral edge, and the second module may each comprise a separate improvement.

The kit and assembly may also include an elongated support plate having an opening encircling the longitudinal axis and allowing access to the bottom of the base opposite the cylindrical sidewall of the base. The support plate has a length sufficient to extend beyond the ends of two opposing ends of the base flange. The support plate may have a generally rectangular and planar shape with a plurality of fingers extending from an upper surface of the plate. The fingers may be configured to pierce the base flange and connect the support plate to the base flange. A plurality of the fingers may also be configured and located to extend through a plurality of slots extending through the base flange to connect the support plate to the base flange.

BRIEF DESCRIPTION OF THE DRAWINGS

These and other features and advantages of the invention will become more apparent in light of the following discussion and drawings, in which like numbers refer to like parts throughout, and in which:

FIG. 18 is a perspective view of the juncture of a corrugated form stabilizing plate with the base of FIG. 17;

FIG. 19 is a bottom perspective view of the assembly of FIG. 17;

FIG. 20 is a bottom perspective view of the assembly of FIG. 17 but with the bottom cover removed;

FIG. 21 is a bottom, perspective section view of the diaphragm seal of FIG. 1;

FIG. 22 is a section view of the extendable sleeve of FIG. 17 on a corrugated support;

FIG. 23 is a sectional view taken along 23-23 of FIG. 24a;

FIG. 24a is a top view of two halves of the base housing, each of a different base, joined together;

FIG. 24b is a side view of the joined half-housings of FIG. 24a;

FIG. 28 is a perspective view of the water seal of FIG. 27 in an assembled configuration;

FIG. 29 is a top view of the water seal of FIG. 28;

FIG. 30 is a sectional view taken along 30-30 of FIG. 29;

FIG. 31 is a perspective view of a water dam for use with the passage tube assembly 10 of FIG. 1;

FIG. 32 is an exploded view of the water dam of FIG. 31;

FIG. 34 is an exploded perspective view of an aerator for use with the passage tube assembly 10 of FIG. 1;

FIG. 35a is a side view of the assembled aerator and passage tube of FIG. 34;

FIG. 35b is a front view of the assembled aerator and passage tube of FIG. 35a; and FIG. 35c is a sectional view taken along 36c-36c of FIG. 35b;

FIG. 37a is a perspective view of a further embodiment of the cap of FIGS. 13-15;

FIG. 37b is a side view of the cap of FIG. 37a;

FIG. 37c is a side view of the cap of FIG. 37a with the inclined surface more radially outward;

FIG. 38a is a perspective view of a base of FIG. 1 with modified supporting plates;

FIG. 38c is a side view of the base of FIG. 38a;

FIG. 40 is a perspective view of the assembled aerator and passage tube having ring stiffeners on an outer extension tube; and FIG. 41 is a side view of an extension tube having longitudinal stiffeners.

DETAILED DESCRIPTION

Figure 1:
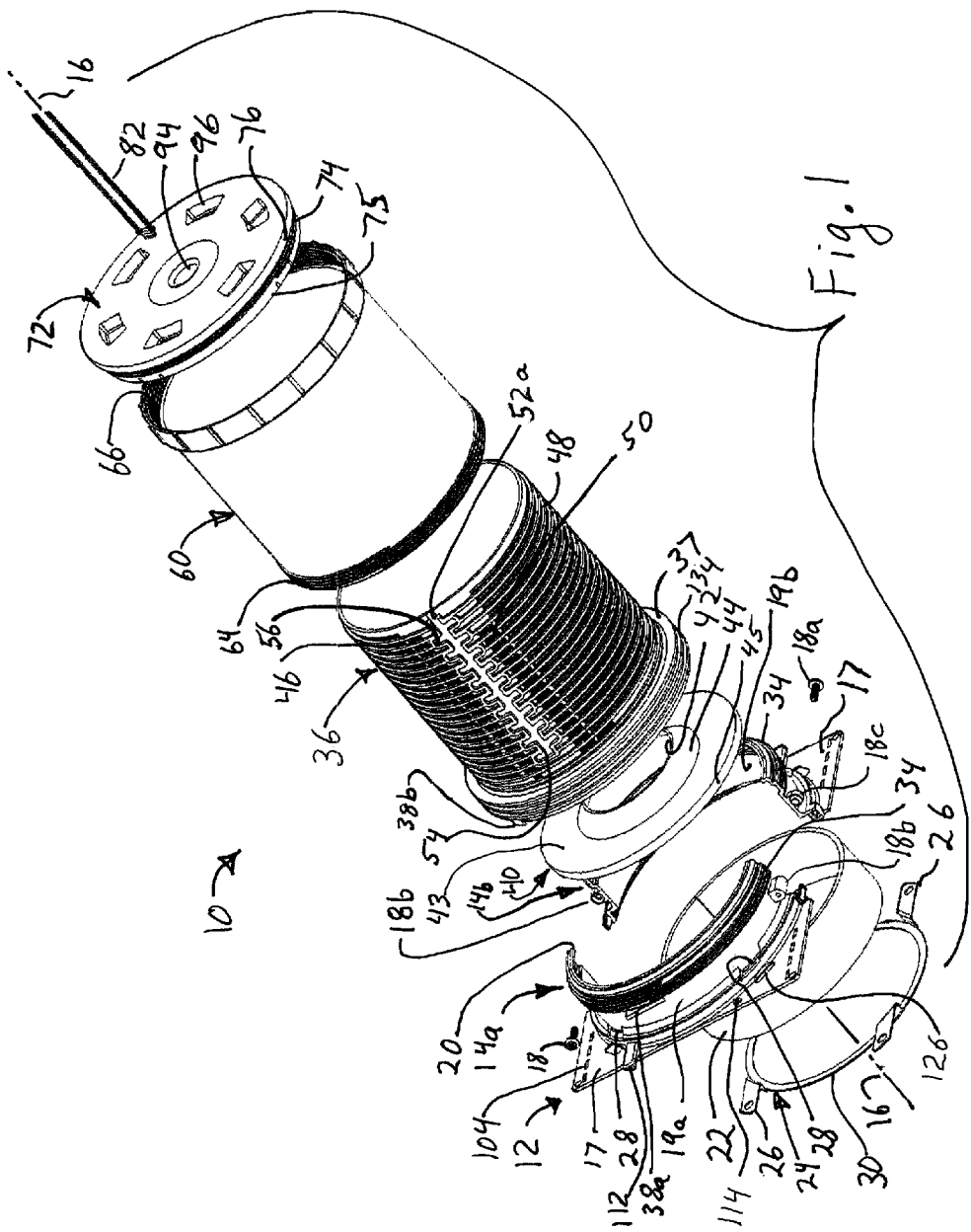
FIG. 1 is an exploded perspective view of an extendable sleeve for forming a tubular passage in a poured concrete floor.

Referring to FIGS. 1-20 a passage tube assembly is provided having a base 12 formed of a housing 14 having two-parts 14a and 14b which clamp radially about a longitudinal axis 16 of the passage tube assembly 10 and base 12, with fasteners 18a clamping mating bosses 18b, 18c on opposing housing parts together in order to secure the housing parts 14a, 14b together. The base preferably has a flange 17 extending outward from the lower end of the base 12. As used herein, the relative terms inner and outer, inward and outward, are with respect to longitudinal axis 16. The relative terms above and below, upper or lower, upwards and downwards are also relative to the position along longitudinal axis 16 with respect to flange 17 on base 12 in the orientation of FIGS. 1 and 4-6, so that housing 14 and passage tube assembly are above base flange 17.

Referring especially to FIGS. 1-3 and 6, the housing parts 14a, 14b each have a curved sidewall extending along the longitudinal axis 16 and an inwardly extending lip 20 on an upper end to restrain upward axial movement of a tubular cylinder 22 of intumescent material placed inside the housing 14. The housing parts 14a, 14b may each have a lower lip (not shown) at a lower end to restrain downward axial movement of the tubular cylinder 22 of intumescent material, in which case the tubular cylinder 22 of intumescent material is placed in one part of the base 12 or housing parts 14a, 14b before the two parts are joined and fastened together to form the base 12. But using two, (one upper and one lower lip) may complicate molding so preferably only one lip is used, upper lip 20, with the tubular cylinder 22 of intumescent material held at the bottom of the base 12 by a retaining clip 24 having tabs 26 that pass through mating openings 28 in each of the two-part housing 14 as the two parts of the housing are assembled.

The retaining clip 24 has an annular bottom portion 30 to hold the bottom of the tubular cylinder 22 of intumescent material, with the annular bottom portion being offset axially from four extending tabs 26 for reasons discussed later. After assembly, the tabs 26 extend from the inside to the outside of housing 14 and the tabs are then bent to lock the retaining clip 24 in place so the tubular cylinder 22 of intumescent material is constrained on three sides by the annular bottom portion 30 of the clip 24 and the base's sidewall 19 and upper lip 20, so that thermal expansion of the tubular cylinder 22 of intumescent material is directed generally inward toward longitudinal axis 16.

The two parts of housing 14a, 14b are fastened together by snaps locks, threaded fasteners, other mechanical locks, or adhesives, with screws 18 being illustrated in the Figures. The lower end of the base 12 has flange 17 extending outward from the base's sidewall 19 with holes 32 in the flange to allow the flange to be nailed, screwed or otherwise fastened to a support 33. That provides an easily molded housing 14 that may be quickly assembled to form base 12, with retaining clip 24 holding the tubular cylinder 22 of intumescent material in place within the base 12.

The tubular cylinder 22 of intumescent material may be a continuous annular ring or a split ring with two adjacent ends separated by a slot. However, the cylinder 22 may also be formed by methods obtained from prior art, including rolled shapes of intumescent materials. The tubular cylinder 22 of intumescent material is preferably preformed for easy of assembly. The tubular cylinder 22 of intumescent material may be formed in a corrugated shape to expand faster and to expand to a greater distance than previously achieved.

Referring to FIGS. 1-3 and 11-12, the upper end of the base 12 may have external threads 34 so that a lower end of a first sleeve or tube 36, preferably a graduated tube 36, can threadingly engage the base 12 via mating internal threads 35 (FIG. 12) on the inner surface of the first tube 36 adjacent the lower end of the first tube 36. By graduated, it is meant the outer surface of the tube 36 has physically protruding length indicators, described later. Advantageously, the cylindrical wall forming first tube 36 is generally concentric with the lip 20 on the base 12, requiring a lateral, outward offset, stepped or enlarged portion 37 so that the bottom end of first tube is larger in diameter than the remaining upper portion of tube 36, with the internal threads 35 formed on that enlarged stepped portion.

The threads 34 are preferably double lead threads, with one lead on each half 14a, 14b of the housing. Thus, the mating threads 35 on first tube 36 are also preferably double lead threads. A rotation stop 38a on sidewall 19, just below the threads 34 abuts a mating stop 38b on the bottom end of first tube 36 in order to limit the engagement of mating threads on the base 12 and first tube 36 and also accurately positions the first tube 36 relative to the base 12 and particularly positions the tube 36 relative to base flange 17.

As best seen in FIGS. 1, 6, 12, 16 and 21, the first tube 36 clamps an outer periphery of a shaped seal diaphragm 40 against the cylindrical wall forming base 12, preferably against the inwardly extending upper lip 20 of the base 12. The first tube 36 may have an inwardly extending flange 39 (FIG. 12, 16) located concentric with the location of upper lip 20 or another portion of base 12 to squeeze and seal against the seal 40. The inward flange 39 is preferably at the juncture of the enlarged or stepped portion 37 with the remainder of the first sleeve or tube 60 so as to provide a larger radially extending surface to abut the periphery of diaphragm seal 40. The depending skirt 45 of the diaphragm seal 40 is advantageously located between an inner surface of the stepped portion 37 and an outer surface of the base 12 adjacent lip 20. Thus, the lip or skirt 45 on the diaphragm seal 40 resists radially inward motion when it is clamped between the base 12 and the first tube 36. That provides a strong, fluid seal for the outer periphery of diaphragm seal 40 with the mating base 12 and first tube 36. The periphery seal is believed capable of meeting and preferably exceeding regulatory fluid retention requirements.

The diaphragm 40 has a central opening 42 that is preferably surrounded by an inclined or curved, funnel shaped wall 44 that encircles and defines opening 42. As used herein, the term "funnel shaped" includes walls that are straight and inclined (e.g., like a cone) and also includes curved walls. The funnel shaped wall 44 in turn preferably joins a generally planar annular portion 43 having a depending skirt 45 at an outer periphery thereof. The opposing surfaces of the base 12 and the first tube 36 advantageously, but optionally have sealing surfaces, such as opposing tongue-and-groove configurations, in order to further ensure the parts sealingly engage opposing surfaces of the diaphragm seal 40. The opposing surfaces of the base 12 and first tube 36 clamp the outer periphery of the diaphragm seal 40 adjacent the depending flange 45 and in the flat annular portion 43 near the juncture with the flange 45.

In use, a pipe extends along longitudinal axis 20 and through the opening 42 which seals against the outer surface of the pipe. The opening 42 is selected to be sufficiently smaller in diameter than the outer diameter of the pipe that a fluid tight seal is established meeting and preferably exceeding regulatory requirements. The pipe basically stretches the elastic opening 42 and funnel shaped portion 44 to form a friction seal with the pipe. Further, the base 12 and pipe are fit relative to each other so the pipe passes through the diaphragm seal 40 in the axial direction along which the funnel shaped portion 44 is directed, the upward direction. That allows fluid collected between the inside of the first tube 36 and the outside of the pipe to press the funnel shaped portion 44 against the pipe further increasing the sealing force. As desired, the funnel shaped portion 44 may have concentric ridges encircling the opening 42 in order to increase the grip between the funnel shaped portion 44 and the pipe during use, and to further increase the water seal between the parts.

The funnel shape wall 44 also allows lateral movement of the opening 42 in order to accommodate pipe locations that are offset from the desired center position along axis 16. The curved, funnel walls 44 also allow more flexibility in the opening 42 before tearing and may lie against the pipe to provide a better seal. An elastomeric or rubber diaphragm 40 is believed suitable, preferably silicon or neoprene or Thermo Plastic Rubber (TPR). The seal 40 is preferably made of a thin, flexible material. As used herein for the seal 40, thin means a thickness between opposing surfaces that is less than about 10% the diameter of the seal at the outer periphery and preferably less than 5% of the diameter of the seal at the outer periphery. The opening 42 is smaller than the diameter D of the smallest pipe that is intended to be passed through the tubular passage assembly 10 and seal 40 so the pipe stretches the opening 42 and creates a frictional grip to help form a water seal. Pipe diameters D from 0.5 inches to 4 inches are common, with larger diameters D up to 8 inches being less common.

Referring to FIGS. 1 and 4-12, the first tube 36 has a first and second set of outwardly extending ridges 46, 48, respectively forming intervening slots between the respective ridges of each set. The first ridges 46 and intervening first slots each extend about half way around a first side or first partial circumference of the first tube 36. The second set of ridges 48 and second slots between those second ridges extend about half way around the opposing, second side or second partial circumference of the first tube 36. The ridges 46, 48 on the first and second sides of the first tube 16 are equally spaced apart about the distance of a saw blade used by construction workers. The first set of ridges are offset from the second set of ridges, with the first set of ridges being spaced in fractions of an inch and the second set of ridges being spaced metrically, preferably in millimeters. Visible indicia 50 (FIGS. 1 & 7) on the first tube 36 discloses a distance from the bottom of the base to each slot, or to the bottom of each ridge (46, 48) forming the slot, so that a worker can cut the first tube 36 to desired, known length by cutting at a slot, with the saw blade guided by the opposing ridges 46 or 48 on each side of the slot. The ridges may be viewed as graduations on the outside of the first tube 36, which is why the first tube 36 may also be referred to as a graduated tube. Regardless of terminology, the graduated ridges 46, 48 and printed indicia 50 identify a plurality of graduated distances from the bottom of the flange 17 of base 12.

The first and second sets of ridges 46, 48 and their intervening slots are in radially aligned planes extending orthogonal to axis 16. These sets of ridges 46, 48 are separated by first and second longitudinal channels 52a, 52b located on opposing sides of the first tube 36. As desired, the printed indicia 50 may be located in one or both longitudinal channels 52a, 52b, or on the outer sides of cylinder 36 in the spaces between adjacent ridges 46 or 48. The ends of two adjacent ridges 46 or two adjacent ridges 48 within each set of ridges may be joined by axially extending end segments 54 (FIG. 7), with alternating pairs of ridges joined by offset end segments 56 (FIG. 7) that are offset circumferentially a short distance from end segments 54 each other to form staggered axial end connections. A latching protrusion 58 (FIG. 7) may extend axially from or near the axially extending end segments 54 to form a snap lock connection described later.

A first extension tube 60 is provided with threads 64, 66 on opposing lower and upper ends of the tube, respectively, preferably with external threads on one end and internal threads on the other end. The threads 64, 66 are preferably double lead threads with one lead beginning on an opposing side of the tube 60 as the other lead. The depicted embodiment has external lower threads 64 and internal upper threads 66. Opposite the external threads 64 on the lower end of extension tube 60 are first and second, locking lugs 70 (FIG. 6) extending inward from opposing inner sides of the extension tube 60 at or adjacent to the end of the extension tube 60. Each locking lug 70 is sized in its circumferential direction to fit within one of the first and second channels 52a, 52b so the extension tube 60 can slide along the outside of the first tube 36. The locking lugs 70 are sized fit into the gaps formed by the staggered axial end segments 54, 56 so that rotating the first extension tube 60 places at least one and preferably both of the locking lugs 70 between two adjacent ridges 46 or 48 on the first tube 36. The latching protrusion 58 advantageously engages a mating recess on the upper edge of the adjoining locking lug 70, to snap-lock the extension tube 60 to the first tube 36. The ends of the ridges 46, 48 and the axial end segments 54, 56 restrain rotation of the lugs 70 and also provide an axial strength if a worker strikes or steps on the extension tube 60. Thus, the lugs 70 hit end segments 54, 56 to stop axial movement of the tube 60 until the lugs are rotated into the channels 52a, 52b.

The first extension tube 60 is a known length L and by viewing the distance reflected by the visible indicia 50 marked on the outer sides of the first tube 36 and aligned with the lower edge of the first extension tube 60, the length from the bottom of flange 17 on the base 12 to the upper, distal end of the extension tube 60 is known. For example, if the lower edge of extension tube 60 is aligned with the ridges 46 or 48 corresponding to printed indicia 50 indicating a distance of 3 inches from the bottom of flange 17 on base 12, and if the extension tube 36 is 5.5 inches end to end, then the distal end of the first extension tube 70 is 3+5.5=8.5 inches from the bottom of base 12. That system allows easy adjustment of the height of the passage tube assembly.

Figure 9:
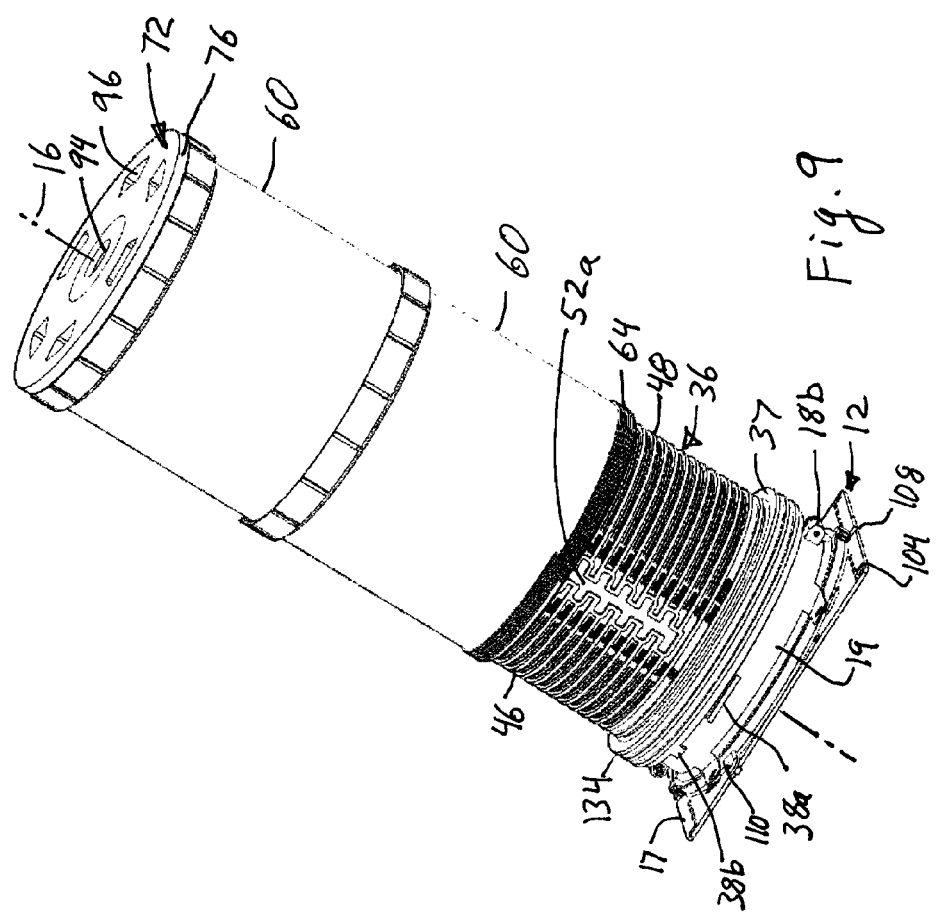
FIG. 9 is a top perspective view of the extendable sleeve of FIG. 1 with a second extension tube thereon.
Figure 10:
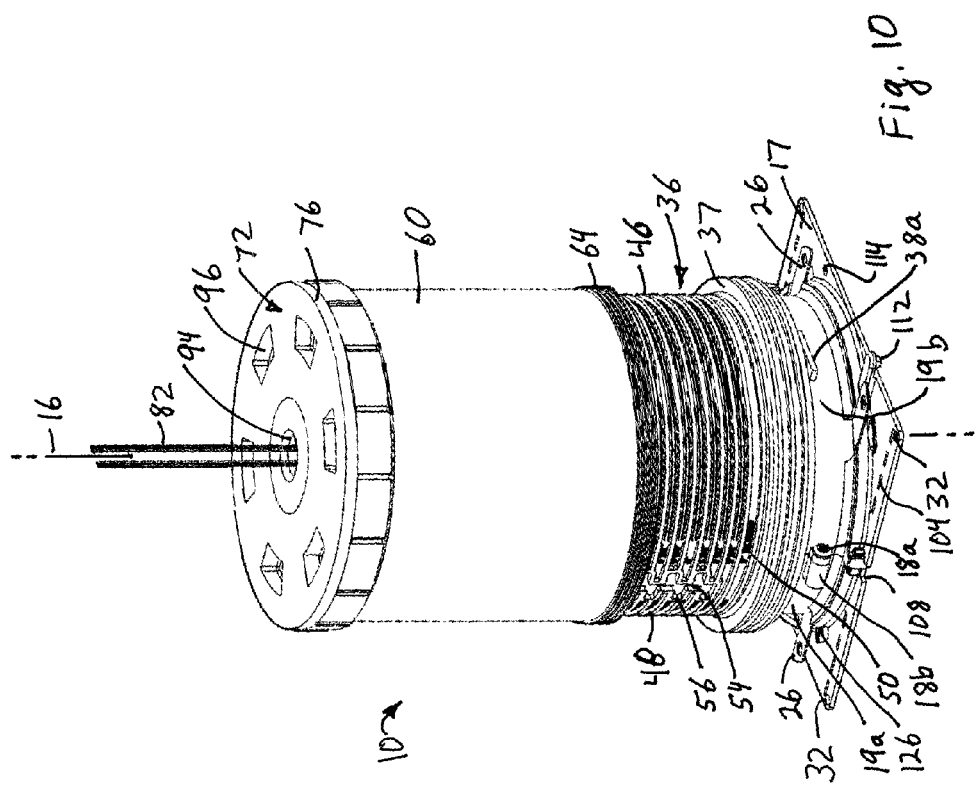
FIG. 10 is a top perspective view of the extendable sleeve of FIG. 1.
Figure 11:
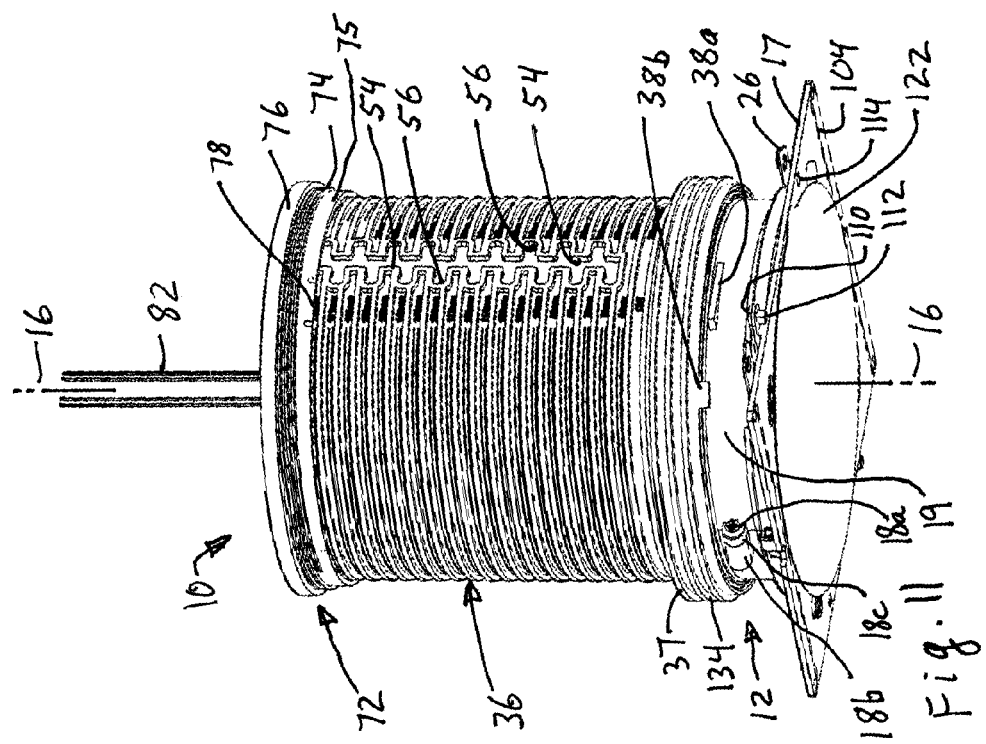
FIG. 11 is a bottom perspective view of the base and first tube and cap of FIG. 1.

When the first extension tube 60 is fastened to the first tube 36 the free or distal end of the extension tube 60 can be closed off or another extension tube 60 can be added. If another extension tube 60 was added to the above example, the distance of passage tube assembly would be 3+5.5+5.5=14 inches from the flange 19 to the end of the second extension tube 60. Additional extension tubes may be added by use of the mating threads 66 on the distal end of the first extension tube 60, as seen in FIG. 9. Again, the extension tubes 60 are each of known length and preferably all the same length so the height to the end of a stack of extension tubes can be readily determined by adding one or more extension tubs 60. Depending on how the end of the distal extension tube 60 is closed, some length accommodation may need to be made to accommodate for the closure.

The end of the last extension tube 60 can be closed by a cap 72 having a skirt that fits inside or outside the distal end of the last extension tube 60, but preferably the cap 72 has threads 74 configured to threadingly engage 66 on the end of extension tube 60. The cap threads 74 are thus preferably also double led threads, with one lead beginning on an opposite side of the cap as the other lead. Since the threads 66 are preferably internal threads the cap threads 74 are preferably external threads, preferably on a depending skirt 75 depending from a slightly larger annular top that results in an annular flange 76 abutting the distal end of the extension 60 to more accurately define the length of the tubular passage assembly 10 when the flange 76 abuts the distal end of extension tube 60, increasing the length of tubular passage assembly 10 by the axial length of the flange 60. The annular flange 76 abutting the distal end of extension tube 60 also provides a stronger assembly to transfer forces along longitudinal axis 16 through the extension tube 60.

Referring to FIGS. 5-8 and 15-16, if the first tube 36 is cut to length between ridges 46, 48 and no extension tube 60 is used, or if the first tube 36 is not cut but no extension tube 60 is used, then the cap 72 is fastened to the ridges 46, 48 on the first tube 36 by one or more latches or lugs or snaps 78 (FIG. 14-16) extending inward from the cylindrical skirt on which the threads 74 are formed. The lugs 78 may optionally, but less preferably correspond to lugs 70 and fit within channels 52a, 52b and engage ridges 46, 48 in the same or similar manner, the description of which is not repeated. Preferably though, the lugs 78 may take the form of snap locks with a surface inclined to resiliently bend and slide over the ridge 46, 48 on the distal end of the first tube 36 and latch into the groove between the adjacent ridges. Opposing ends of lugs 78 may be bounded by slits through the skirt 75 on which the lugs are formed to provide a resilient latch that can bend to slide over the ridges 46, 48. The skirt 75 of the cap 72 thus has a releasable fastening mechanism on both sides of the skirt, with cap threads 74 on the outer surface of the skirt and snap locks or lugs 78 on the inner surface of the skirt.

Figure 12:
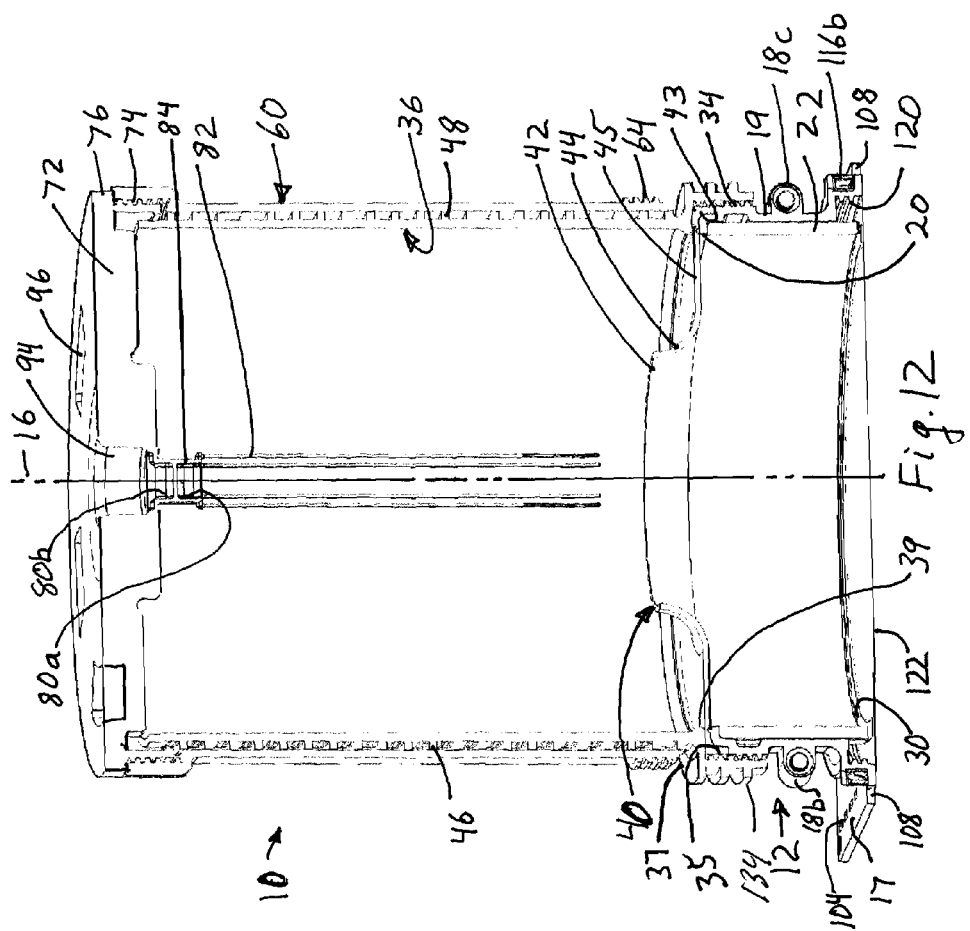
FIG. 12 is a section view of the extendable tube of FIG. 6 with a cap and locating filaments thereon in a position for shipping.
Figure 13:
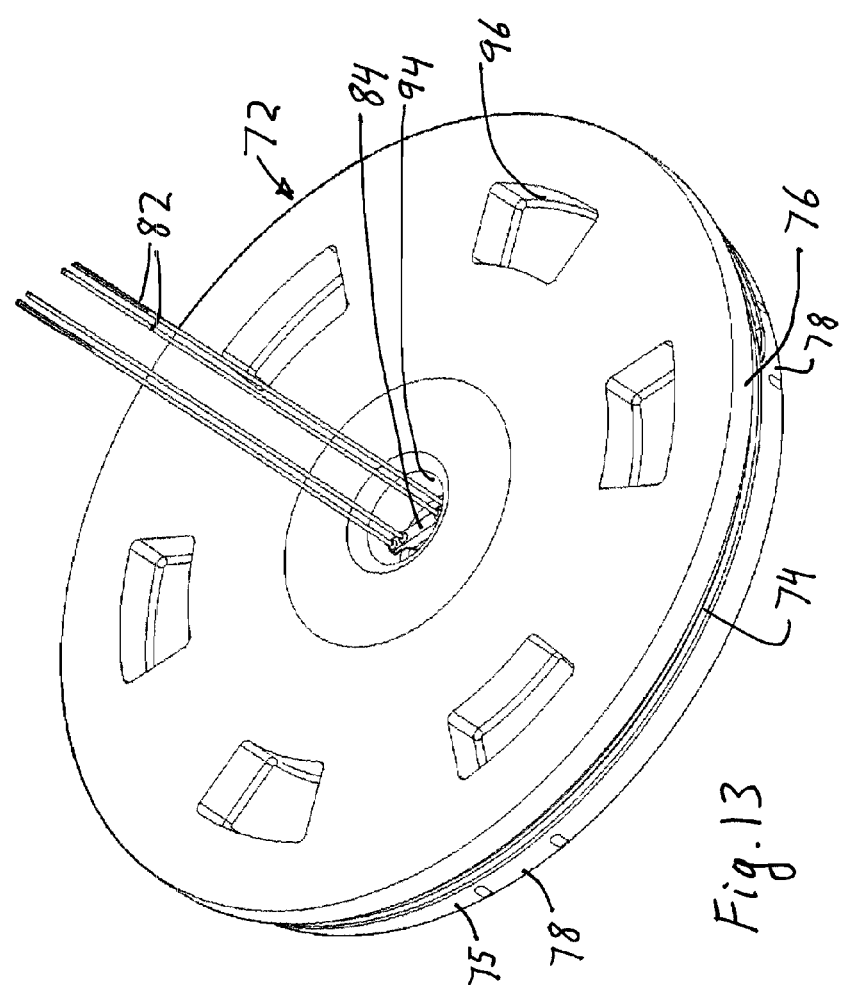
FIG. 13 is a top perspective view of a cap of FIG. 1.

Referring to FIGS. 1 and 12-16, the cap 72 may have an inner and outer mount or connector 80a, 80b respectively each on respective internal and external surfaces of the cap 72. At least one and preferably two pairs of locating filaments 82 extend from a filament base 84 that is configured to mate with each of the connectors 80a, 80b. The connectors 80 may comprise a shaped recess or shaped protrusion, with the mating filament base 84 comprising a protrusion or recess with a mating shape. During shipment, as seen in FIG. 12, the filament base 84 may be releasably connected to the inside connector 80a of the cap 72, preferably at the center of the cap 72 so the locating filaments 82 extend along the longitudinal axis 16 inside the extension tube 60 and/or inside the first tube 36. The filament 82 and its base 84 may be shipped separately, but then they may be more easily separated and lost so it is preferably to ship the parts as a unit. During installation, the cap 72 is removed, the length of tubular passage assembly 10 adjusted by cutting the first tube 36 or positioning one or more extension tubes 60 on the first tube 36.

Referring to FIGS. 1, 10-11 and 13, after the length of the tubular passage assembly 10 is adjusted, the cap 72 is screwed onto the distal extension tube 60 or latched onto the ridges of the first tube 36—but only after the connector and locating filaments are removed from the inside of the cap 72 and fastened to the connector 80b on the outside of the cap 72 so the locating filaments 82 extend upward along the longitudinal axis of the tubes and away from the base 12 of the tubular passage.

When concrete is poured and finished, the locating filaments 82 will stick out of the concrete so the distal end of passage tube assembly covered by cap 72 can be located. The locating filaments 82 are selected to be thin enough to bend and not break during troweling of the concrete, and the connector 80 and filament base 84 are configured and located relative to the cap 72 so the locating filaments bend at the juncture with the connector rather than break during troweling. Nylon monofilaments about 20 to 40 thousandths of an inch in diameter and about 2-6 inches in length are believed suitable. The monofilaments could be color coded to reflect the type of pipe with which the tubular passage assembly 10 is intended for use, such as red for metal and white for plastic. Similarly, tabs could be provided having matching color coding. The removable tabs 124 are visible only from the bottom after the concrete deck is poured so color coded filaments 82 could provide a visible indicator from the top side of the concrete surface. Since the pipes are preferably run from the bottom up, and since the filaments 82 and cap 72 may be lost or attached to the wrong passage assembly 10, the removable tabs 124 are the preferred identification mechanism.

Referring to FIGS. 12-16, the exterior connector 80b is preferably located in a recess 94 preferably a cylindrical recess centered on longitudinal axis 16 during use. The recess 94 preferably has rounded or chamfered edges to reduce cutting, damaging or breaking of abutting locating filaments 82. The connector 80b and filament base 84 are sized so the juncture of the locating filaments 82 with the filament base 84 is located below the exterior surface of the cap 72 so that when a trowel blade or float repeatedly bends a filament 82 flat against the concrete surface the filament does not break off but resiliently resumes its position parallel to the longitudinal axis 16. The exterior, axial facing surface of the cap 72 may have wrenching recesses 96 into which a user can insert wrenching tools, such as the jaws of channel-lock pliers, in order to help rotate the cap and remove it after concrete has hardened.

Referring to FIG. 12, during shipment, the first extension 60 may be placed outside of and concentric with the first tube 36, with the lugs 70 sliding in channels 52 and then rotated to engage the lower ridges 46 or 48 adjacent base 12 to fasten the extension tube 60 to the first tube 36. The cap 72 can be threadingly fastened to the threads 66 on the first extension tube 60, with the locating filaments 82 inside the tubes 36, 60 where they will not be broken easily or lost. The cap 72 prevents debris from entering the tube from the upper end of the assembly and thus provides a safety guard to protect personnel foot traffic on the unfinished building floor.

Referring to FIGS. 1-9 and 11-12, the flange 17 19 extending outward from the base 12 can be fastened to a support 33, with FIG. 22 showing a corrugated support 33. Deck corrugations can vary from two to six inches from top to bottom. The support 33 may be a flat surface such as a plywood support or other flat support during use. If the diameter of the base 12 and first tube are large enough so they always extend across at least two or three adjacent corrugations of a corrugated support 33 then the tubular passage assembly 10 is largely self-supporting and the flange 17 may mount to triangular shaped ears of a square with the circular passage of sidewall 19 having the roughly same diameter as the length of a square shaped flange 17 and centered in that square flange. If the diameter of sidewall 19 and tube 36 are smaller, then the base flange 17 must extend over enough corrugations to provide a stable support for the tubular passage assembly 10 and to allow fastening to the corrugated support 33 (FIG. 22). In short, larger flanges 17 may be needed for tubular passages 10 having smaller diameter passages when the tubular passages are used on corrugated supports 33 rather than flat supports 33.

Referring to FIGS. 1 and 17-20, if a corrugated support 33 is used, then removable stabilizing plates 100 may be attached to a plurality of flanges 17, preferably to opposing flanges 17. One or more, and preferably a plurality of offset fingers 102 on one side of a rectangular stabilizing plate may mate with correspondingly located openings 104 along an edge of one of the base flange 17. Preferably the fingers 17 are generally rectangular strips with rounded distal ends bent to place the rounded distal ends in a plane parallel to but above the plane of the stabilizing plate 100. The openings 104 preferably take the form of slots spaced to correspond with the locations of the fingers 102. Each of the rounded distal ends of the fingers 102 pass from the bottom of the flange 17, through a corresponding openings 104 in the flange 17 and rest against the top of the flange 17 to connect stabilizing plates to the flange. The stabilizing plates provide a wider base to extend across one or more corrugations of the support 33. As desired, stiffening ribs 105 may be formed on or in the plates 100.

The fingers 102 engage the top of the flange 17 and the adjacent portion of stabilizing plate 100 engages the adjacent bottom portion of the flange 17 to provide a stable support for the base 12 as long as weight is exerted downward along longitudinal axis 16. If the base 12 is lifted upward along axis 16, the fingers 102 of the stabilizing plate 12 rotates about the edges of the openings 104 so the outer end of the plate 100 sags downward and inward toward axis 16. To prevent this a holding latch 106 preferably extends upward from the same side of the plate as the fingers 102 and the holding latch has a notch that engages an upper side of the base 12, preferably engaging an upper surface of base flange 17, to keep the stabilizing plate 100 engaged with the flange 17 and to restrain sagging of the outer edge of the plate 100 toward the longitudinal axis 16. A recess, preferably a slot 108 may extend into an edge of the base flange 17 and be located to correspond with the holding latch 106 so the holding latch can more securely engage a surface of the base 12 along a portion of the length of the slot 106.

In use, a stabilizing plate 100 is preferably but optionally fastened to two opposing sides of the base 10 to provide a broader base for the tubular passage assembly 10. The base flange 17 preferably has a recess 106 and finger openings 104 on one or more sides, preferably on opposing sides, and more preferably on each of four sides of a rectangular base, where reference to a rectangular base is used herein to include a square base.

Referring to FIGS. 1-4, 23 and 24A-24B, two separate but adjacent passageway extensions 10 may be joined together, preferably at their base flanges 17. The base 12a may have an elongated latch 110 extending away from base to engage a mating recess in a different base 12b. In the depicted embodiment the base flange 17 has latch 110 extending from the base flange 17, preferably generally horizontally, with a latching end 112 configured to engage a catching surface 114 on a different flange 12b associated with a different base 12b. The latches 110 and catching surfaces 114 are located so that if first and second bases 12a, 12b are placed against each other the latch end 112a of a first base 12a on flange 17a can engage the catch 114b on a second base flange 17b to hold the two bases 12a, 12b together. Preferably, at least one side of each base 12 has one latch 110 and one catch 114 (e.g., a recess) located toward opposing ends of the at least one side, so that the latches 110a, 110b from at least two different base flanges 17a, 17b engage a recess 114b, 114a in the other base flange 17b, 17a to fasten at least the two different base flanges together. Different types of mating projections and recesses can be used, preferably with a male engaging member on one base 12 and a female member on a second base 12. While at least two adjacent tubular passage assemblies 10 may be joined this way, the joinder still allows stabilizing plates 100 to be fastened to the sides of base 17 not joined by the latches 110 and mating catches 112.

Figure 25A:
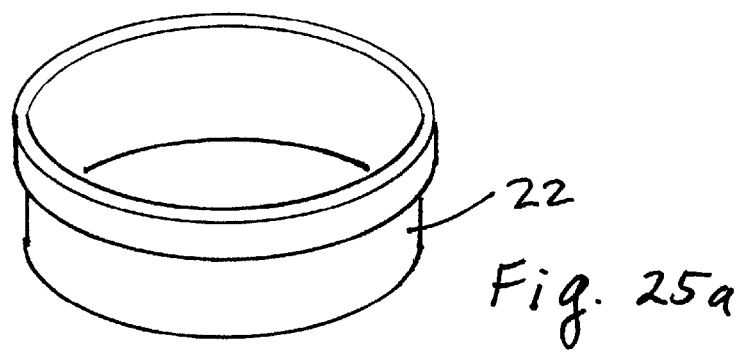
FIG. 25a is a perspective view of a tubular cylinder of intumescent material.
Figure 25B:
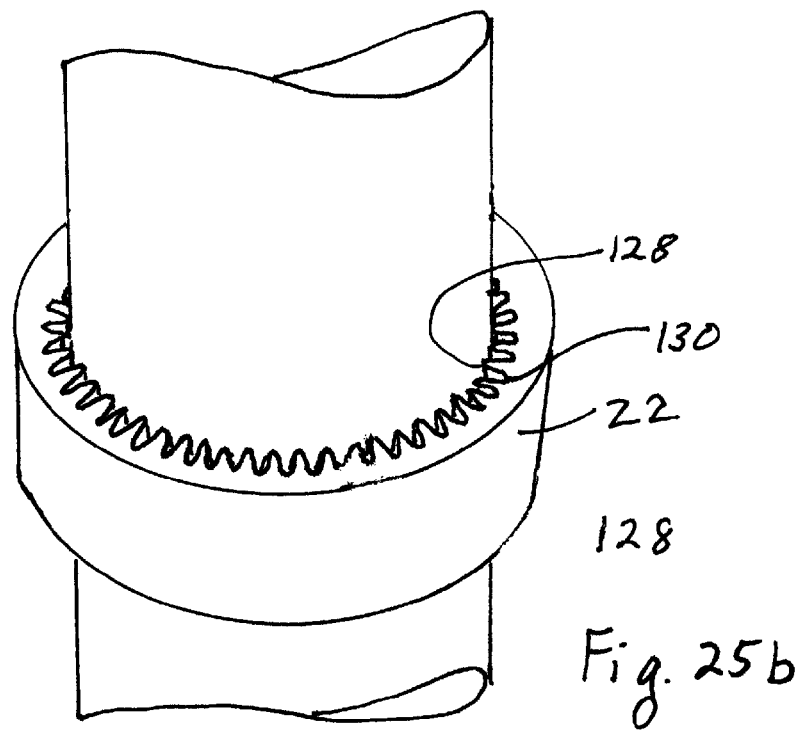
FIG. 25b is a perspective view of a tubular cylinder of intumescent material with interior ribs or crennelations encircling a pipe.
Figure 26A:
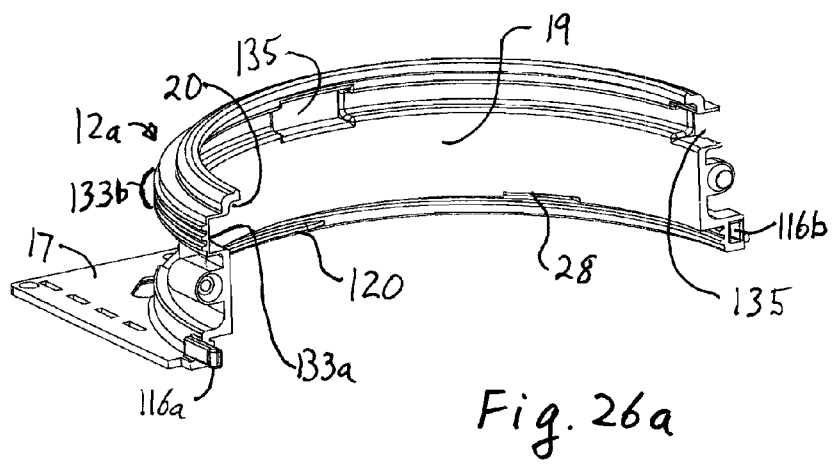
FIG. 26a is a perspective, sectional view taken along section 26a-26a of the base of FIG. 26b.
Figure 26B:
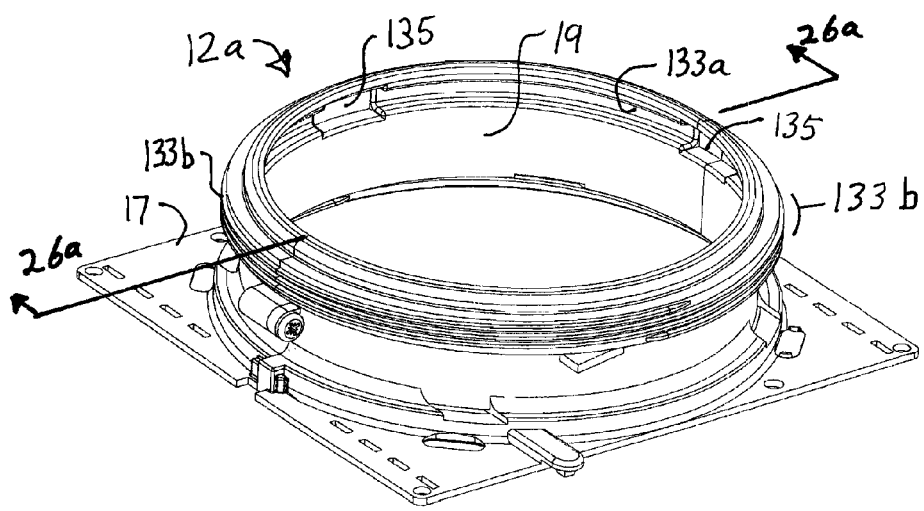
FIG. 26b is a perspective view of a further embodiment of the base of FIG. 1.

Also shown in FIGS. 23, 24A, 25B are a latching members preferably taking the form of snap lock member 116a and a mating catch 116b each located on opposing sides of sidewall 19 and located so that the snap lock members 116a on one housing 14a engage a mating catch 116b on mating housing 14b to latch the housing parts 14a, 14b together. The snap lock member and catch provide a fast connection between housing parts 14a, 14b. The member and catch 116a, 116b are located below the boss receiving the threaded fastener 18, on the split line separating the housing parts 14a, 14b. That split line is located on a plane containing the longitudinal axis 16.

Referring to FIGS. 17-20, for corrugated supports 33, a hole is cut through the corrugation support and the base 12 is positioned over the hole so the longitudinal axis 16 is centered in the hole. An extension tube 60 is passed upward through the hole in the corrugation and fastened to the bottom of the base 12. Preferably the end of the extension tube 60 having external threads 64 passes through the corrugation and engages base 12. The base 12 may have mating screw threads 120 encircling the axis 16 and tubular cylinder 22 of intumescent material and thus located outward of that cylinder 22 and accessible from the lower end of the base. The threads 120 are double lead threads, with one lead on each half 14a, 14b of the housing. To enable the screw threads 120 to extend into the base 12 and still encircle the tubular cylinder 22 of intumescent material, the retaining clip 24 has annular supporting surface 30 offset downward from tabs 26 so that the tabs have a portion extending axially to form an axial offset accommodating the bottom screw threads 120 with the distal ends of tabs 26 then extending outward through openings 28 in the cylindrical sidewalls 19 of the base 12 that encircle the tubular cylinder 22 of intumescent material.

As needed, a removable adhesive cover 122 is placed over the bottom of the base 12 to keep debris from entering the base during shipment, installation, pouring of the concrete and subsequent application of fire retardant spray. The removable adhesive cover may be removed and placed on the open end of extension tube 60 that is screwed into the bottom of the base if desired. Alternatively, separate adhesive covers or removable caps can be provided. As the extension tube 60 has internal threads 66, an additional cap 72 could be provided and used. But since the bottom opening in tube 60 that is covered by adhesive cover 122 is not normally expected to have any concrete pushing against the cover 122, it need not be as strong as cap 72 onto which concrete may be poured and onto which workers may step during use.

Figure 2:
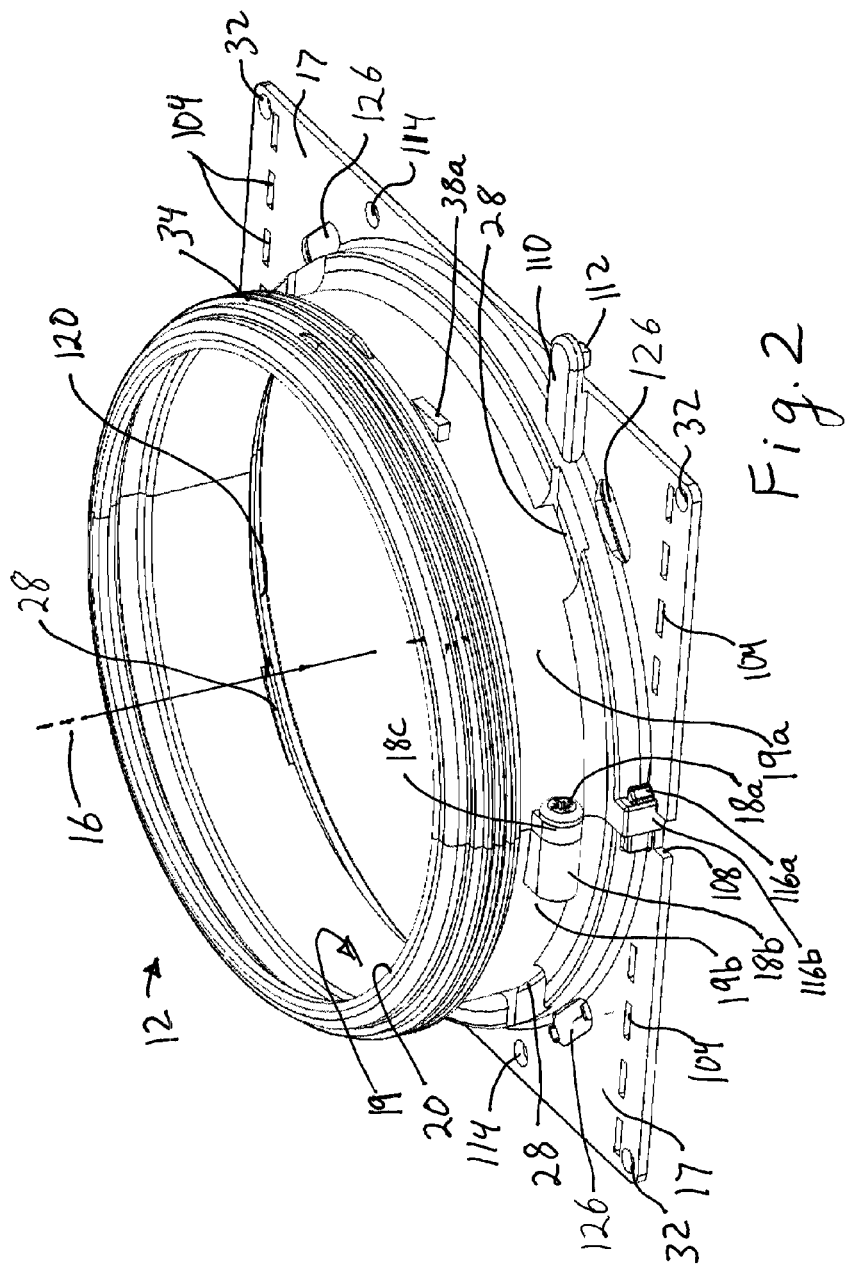
FIG. 2 is a top perspective view of a base of FIG. 1.
Figure 3:
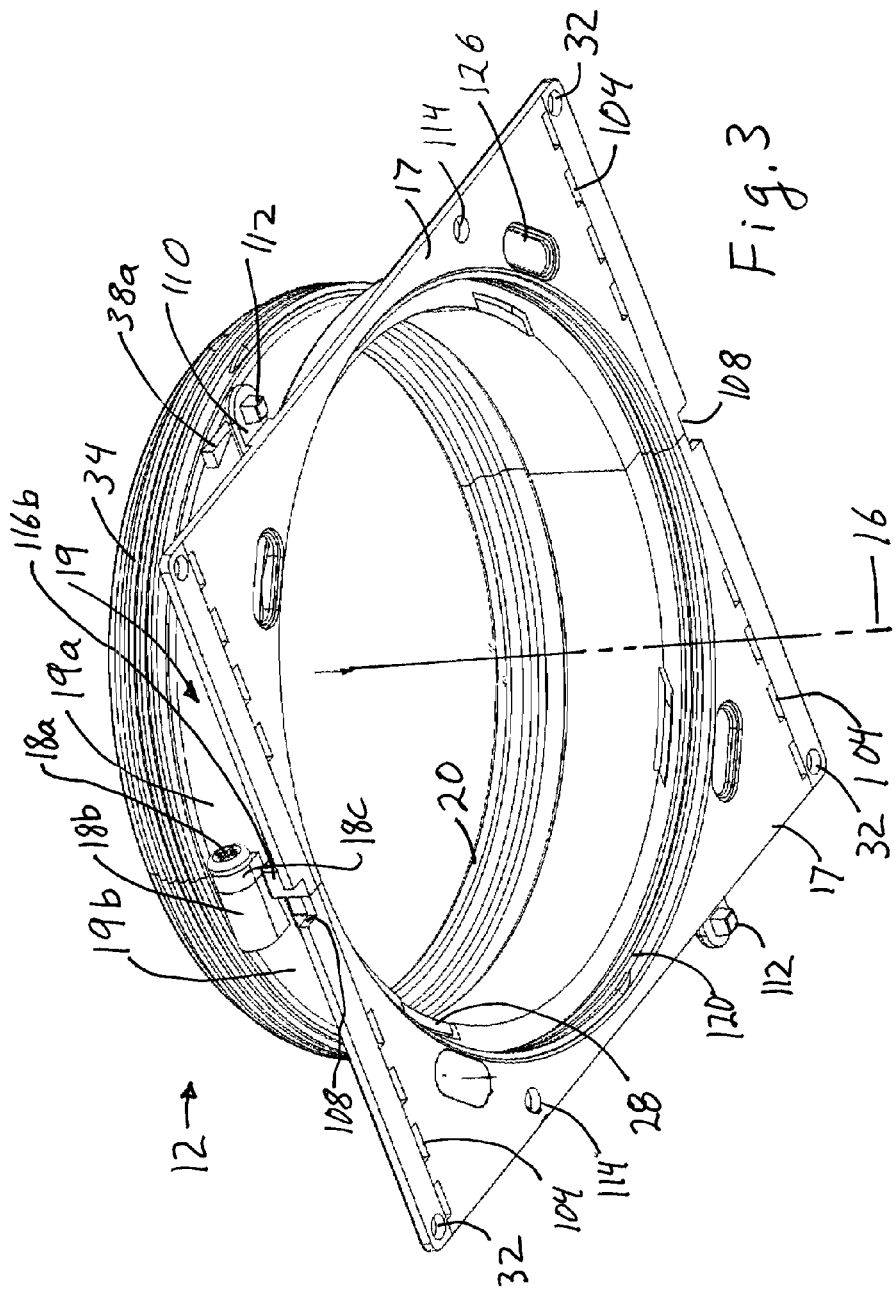
FIG. 3 is a bottom perspective view of the base of FIG. 2.
Figure 4:
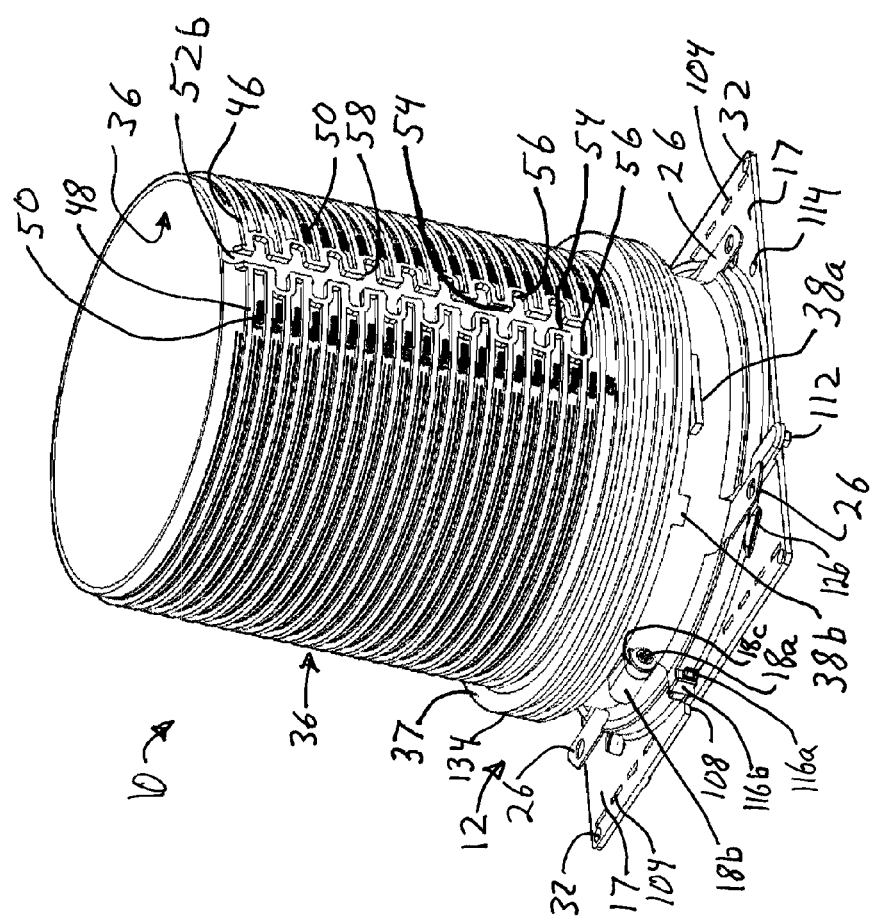
FIG. 4 is a top perspective view of an assembly including a base and a first tube of the extendable sleeve of FIG. 1.
Figure 5:
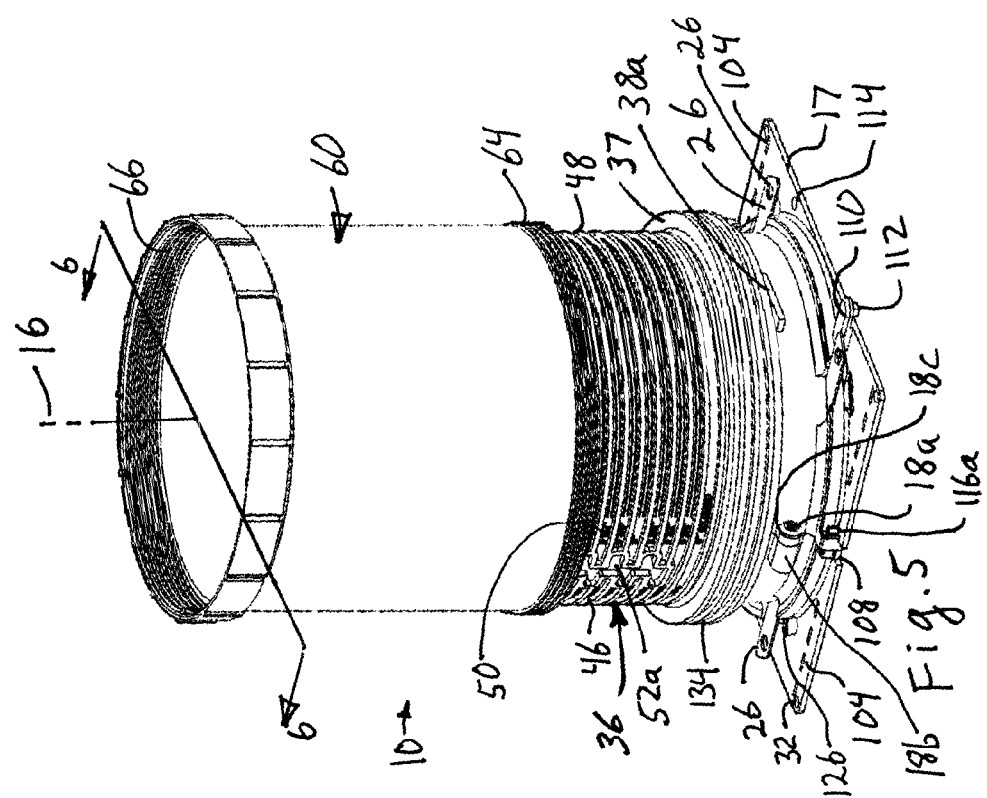
FIG. 5 is a top perspective view of the assembly of FIG. 4 further including a first extension tube.
Figure 6:
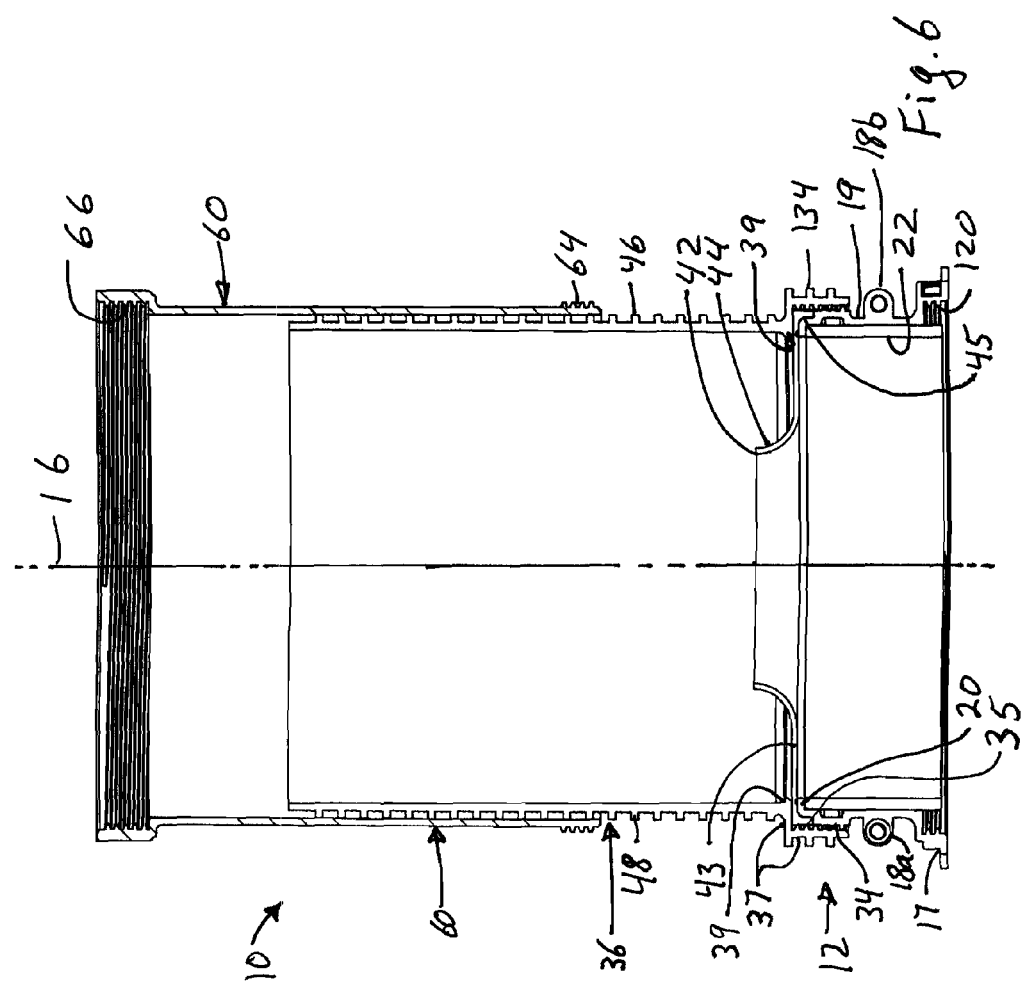
FIG. 6 is a sectional view of the assembly of FIG. 5, taken along 6-6 of FIG. 5.
Figure 7:
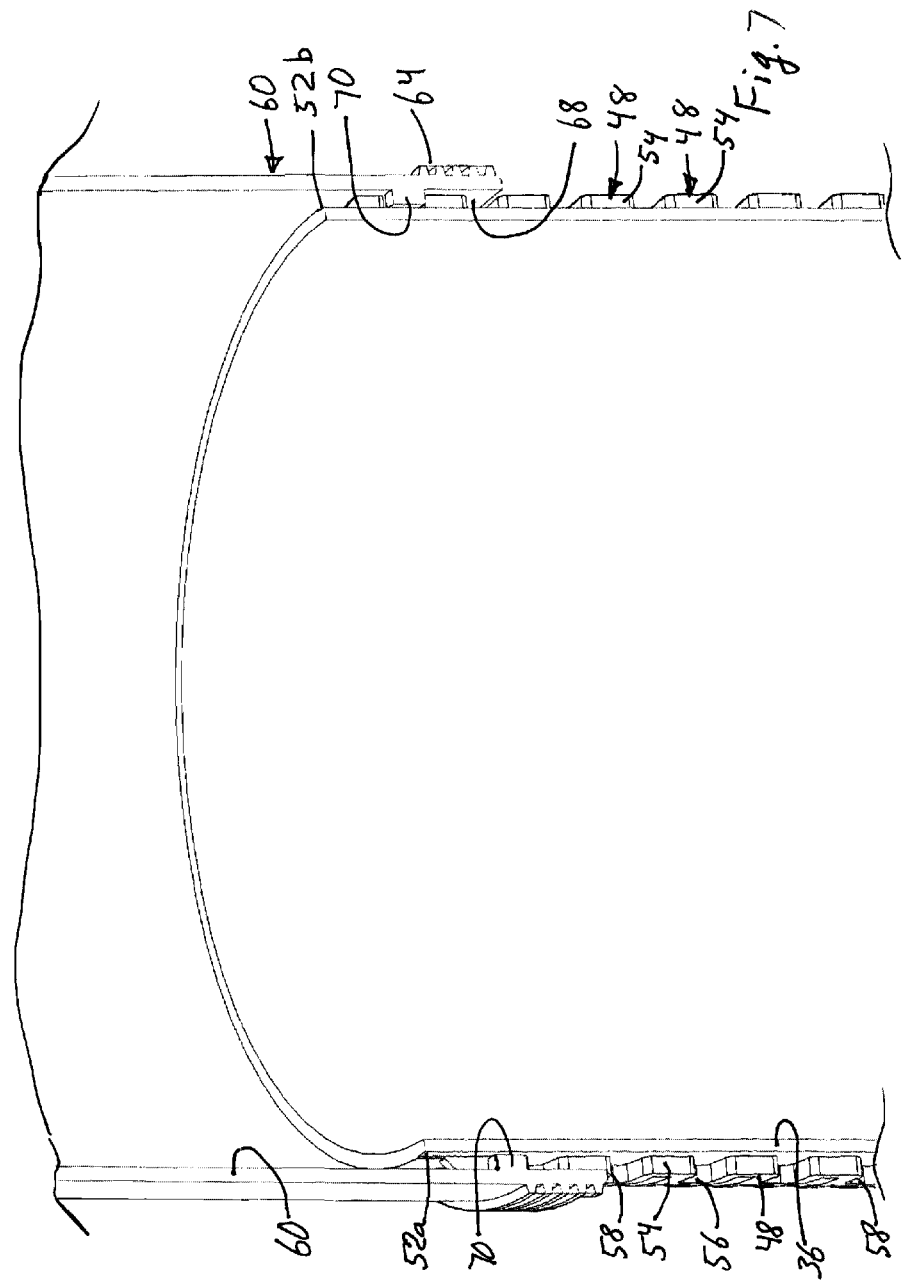
FIG. 7 is a partial perspective view of a portion of FIG. 6 showing the juncture of the first tube and the extension tube.
Figure 8:
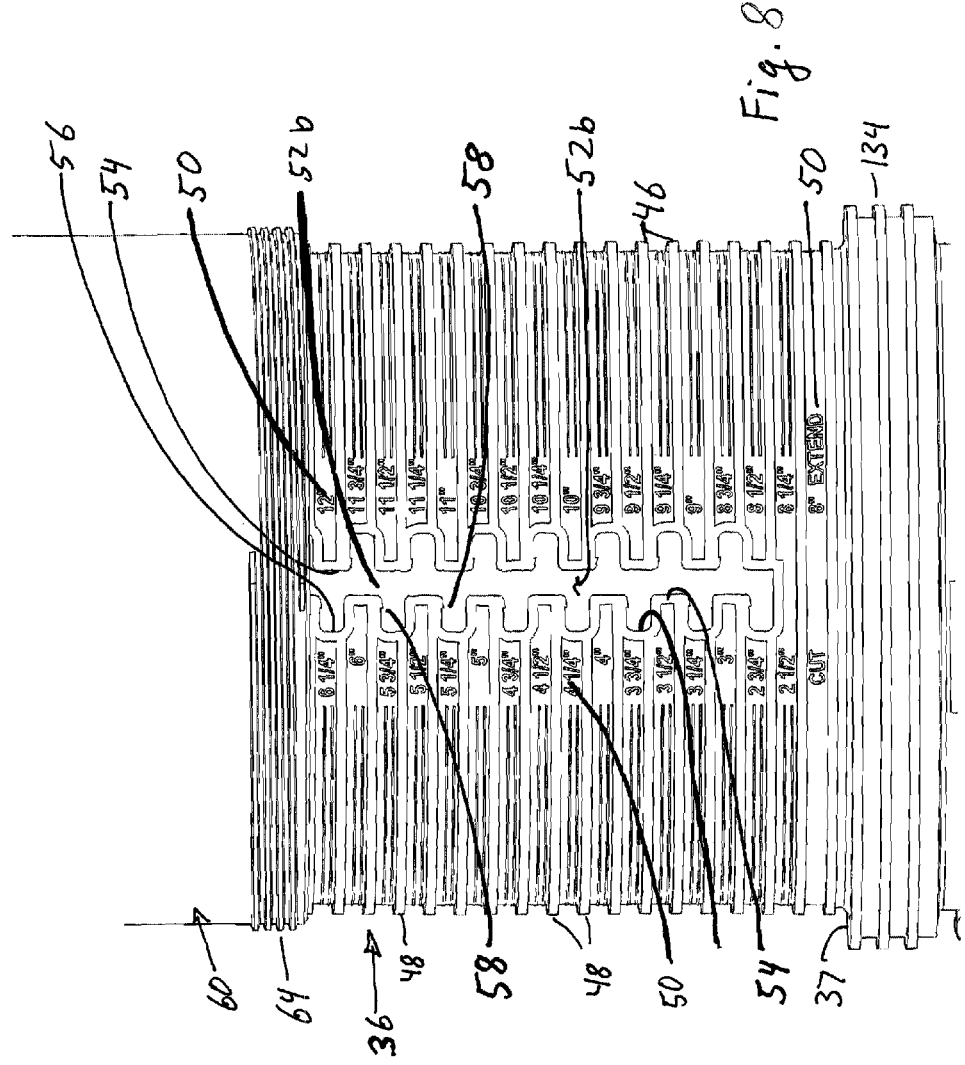
FIG. 8 is a partial perspective view of a portion of FIG. 5 showing the juncture of the first tube and extension tube.

Referring to FIGS. 2 and 17-20 and especially to FIGS. 2 and 18, the base flange 17 may have two removable tabs 124a, 124b installed into or formed in the base, preferably in flange 17. One tab 124a may indicate metal and the other tab 124b may indicate plastic. If the shaped diaphragm 40 is selected for use with metal pipe the plastic tab 124b is removed so that a user can see from looking at the remaining tab 124a on the base 12 that the passage tube is intended for use with metal pipes. If the shaped diaphragm 40 is selected for plastic pipes then the metal tab 124a is removed so that a user can see from looking at the remaining tab 124b on the base 12 that the passage tube assembly is intended for use with plastic pipes. Tabs 124 may be scored, perforated or otherwise surrounded by weakened material so the selected tab can be punched out, broken off or otherwise removed. Alternatively, the tabs 124 may be separate pieces that are selectively pressed into mating openings 126 in flange 17. This provides a way to readily identify at the factory which type of pipe with which the passage tube assembly is to be used.

Referring to FIGS. 25a and 25b, the tubular cylinder 22 of intumescent material is made of a material that expands significantly under heat so as to block off the space between the pipe and the adjacent parts of the expandable sleeve 10 which are encased in concrete. Since plastic pipes sometimes melt under sufficient heat, the tubular cylinder 22 of intumescent material may need to expand to fill more than the space between the cylinder 22 and the adjacent pipe as it may need to compress a melting and flexible walled pipe to ensure blockage of gases and water through the expandable sleeve 10. In order to help the tubular cylinder 22 of intumescent material conform readily it may have kinks or bends or undulations as in FIG. 25b and may be cast in a single ring or formed in strips that are bent to conform to the surrounding structure and held by adhesive tape or encircling bands or supports.

The height of the undulating ridges 128 relative to the adjacent valley 130, and the spacing of the ridges 128 will vary with the diameter of the tubular cylinder 22 of intumescent material. The undulations or crenellations are preferably evenly spaced. A preferred intumescent material for these undulating cylinders 22 is as described in U.S. Pat. Nos. 6,790,893 and 6,645,278.

The tubular cylinder 22 of intumescent material is preferably extruded or molded at a temperature below that at which the material begins to expand significantly. Alternatively, the material may be used in flat strips that are wrapped around molds having the desired cylindrical shape, or having an undulating walled cylindrical shape. Still further, strips of material may be impressed on opposing sides to form undulations and the strip then formed into a cylindrical shape. If formed of strips, the opposing ends of the strips may be left separate, but adjacent each other to form the cylindrical shape with setting of the material retaining that shape, or the adjacent ends may be fastened by various fasteners such as clips, staples, stakes, adhesive, tape, etc. to maintain the shape. The strips of material formed into a cylinder may also have the outer surface wrapped with and fastened to a cylindrical tube of material to maintain the shape. As used herein, the reference to a "cylindrical" tube or ring of intumescent material refers to a tube or ring that is a continuous piece of material, or separate pieces abutting each other or separate pieces joined together or held together—unless expressly defined otherwise.

For assembly, the appropriate base 12, tubular cylinder 22 of intumescent material, retaining clip 24 and diaphragm seal 40 are selected for the desired type of pipe and range of pipe sizes. The tubular cylinder 22 of intumescent material is placed into the annular base 30 of clip 24 and the tabs 26 are inserted through the slots 28 in one half of housing 14 to wedge the cylinder 22 into place against the lip 20 and against the interior of the corresponding sidewall 19. Then the other half of the housing 14 is then aligned with the remaining tabs 26 and the two parts of the housing 14a, 14b are joined and fastened together in abutting relationship to form a base assembly 12. The tabs 26 on retaining clip 24 are bent to inhibit removal and lock the tubular cylinder 22 of intumescent material in place against vertical motion along one direction of longitudinal axis 16. Advantageously, bending tabs 26 also offer increased security in retaining the assembly 10 within the poured concrete, as for example, if the plastic parts are exposed to fire or fire-fighting activities such as sprays of high pressure water. Somewhere along the assembly process, the appropriate tab 124 is either removed or inserted, as the case may be, so that the tab in place on the tubular passageway 10 indicates whether the assembly 10 is for use with metal or plastic pipes, resulting in a base assembly with visible indicia indicating the type of pipe application suitable for use with the base assembly.

After the base assembly 12 is completed, the selected diaphragm seal 40 is then placed on top of the lip 20 of base 12, and the first tube 36 is attached to the base 12, preferably by engaging double lead threads 35 on the tube 36 with mating threads 34 on the base 12. The stops 38a, 38b abut to limit rotation with the parts being sized so the limit stops 38a, 38b engage when the outer periphery of diaphragm seal 40 is securely clamped between base 12 and first tube 36, and preferably clamped between lip 20 on base 12 and inward extending flange 39 on the first tube 36. The limit stops 38a, 38b also locate the distal end of first tube 36 a known distance from the base flange 17, preferably a known distance from the bottom of the base flange 17, with the visible indicia 50 on the tube 36 reflecting distances along longitudinal axis 16 from that base flange 17. The base assembly may include the base 12, retainer 24 and intumescent tube 22 and it may be shipped separately or as part of a kit. The base assembly, diaphragm seal 40 and first tube 36 may be shipped as a separate assembly or as parts of a kit, with or without cap 72 and filament 82 and its mount 84.

Figure 14:
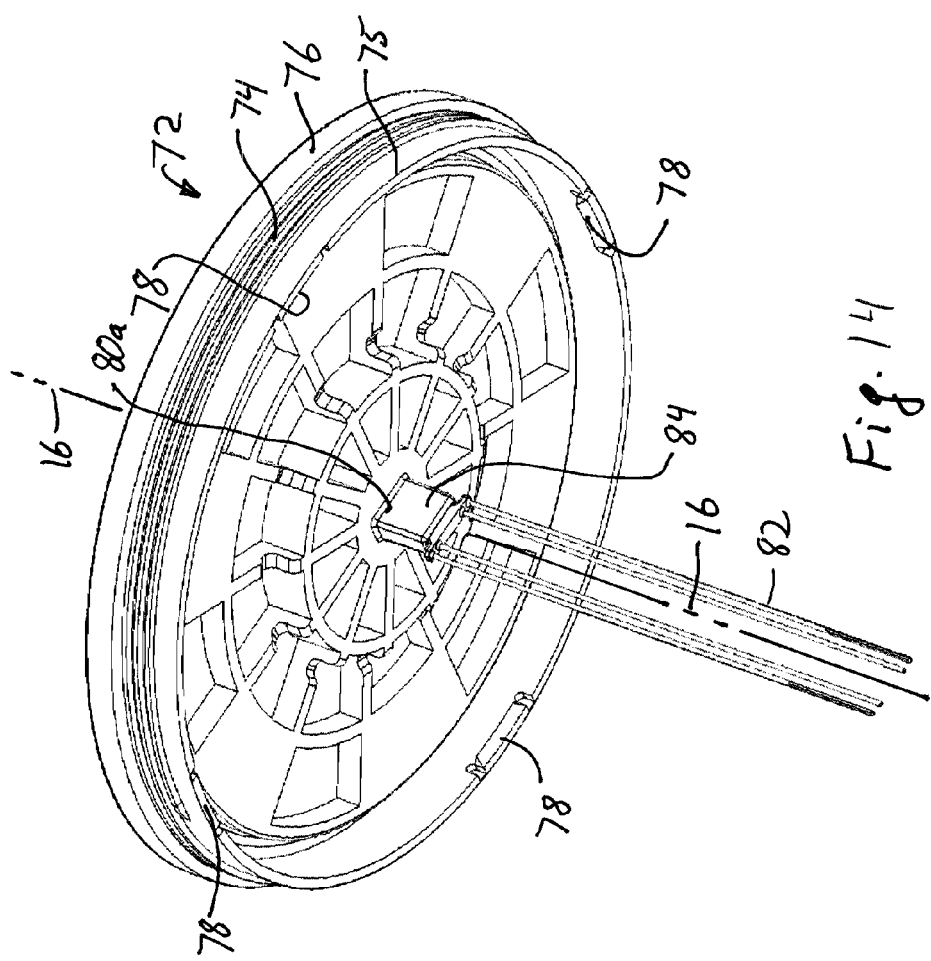
FIG. 14 is a bottom perspective view of the cap of FIG. 11, with locating filaments in a shipping position.
Figure 15:
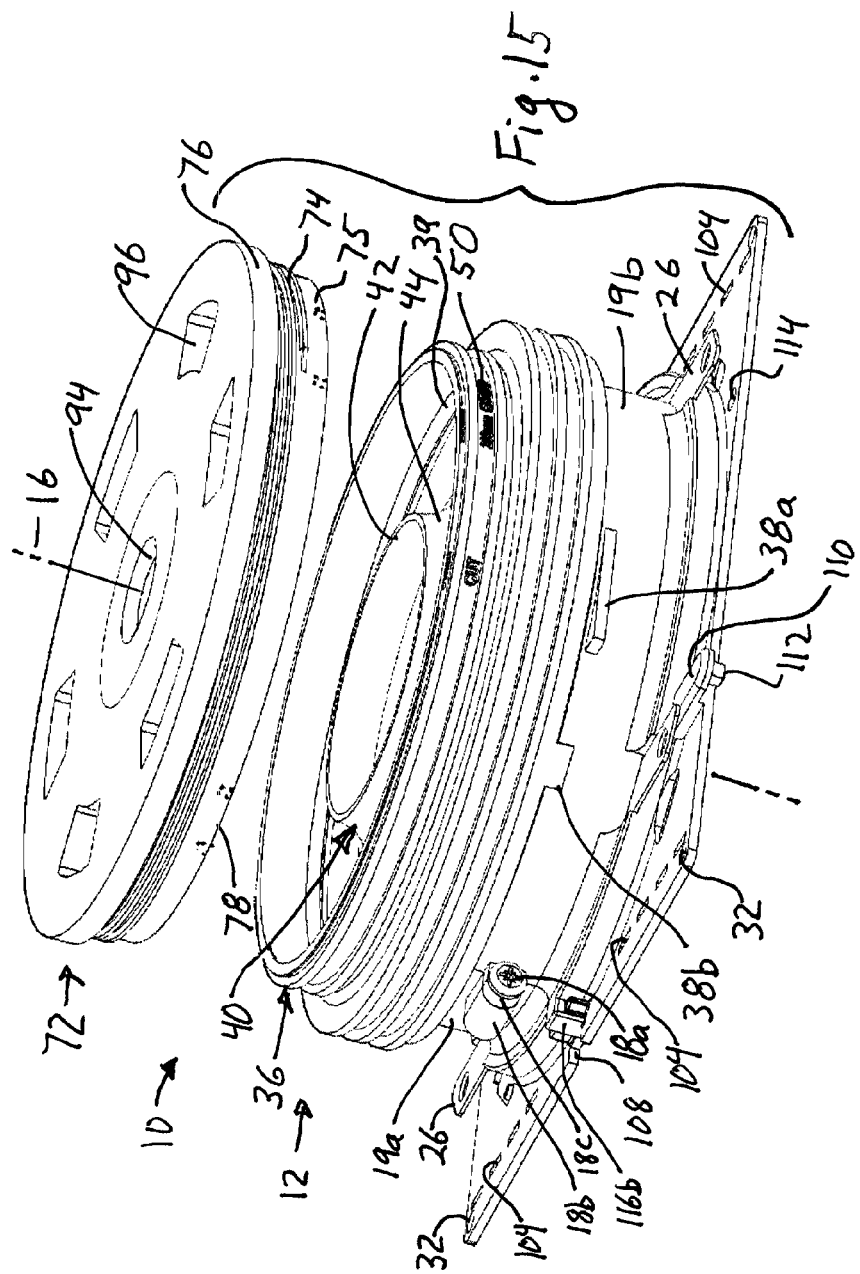
FIG. 15 is a top exploded perspective view of a base, first tube and cap of FIG. 1 with the first tube cut to a very short length.
Figure 16:
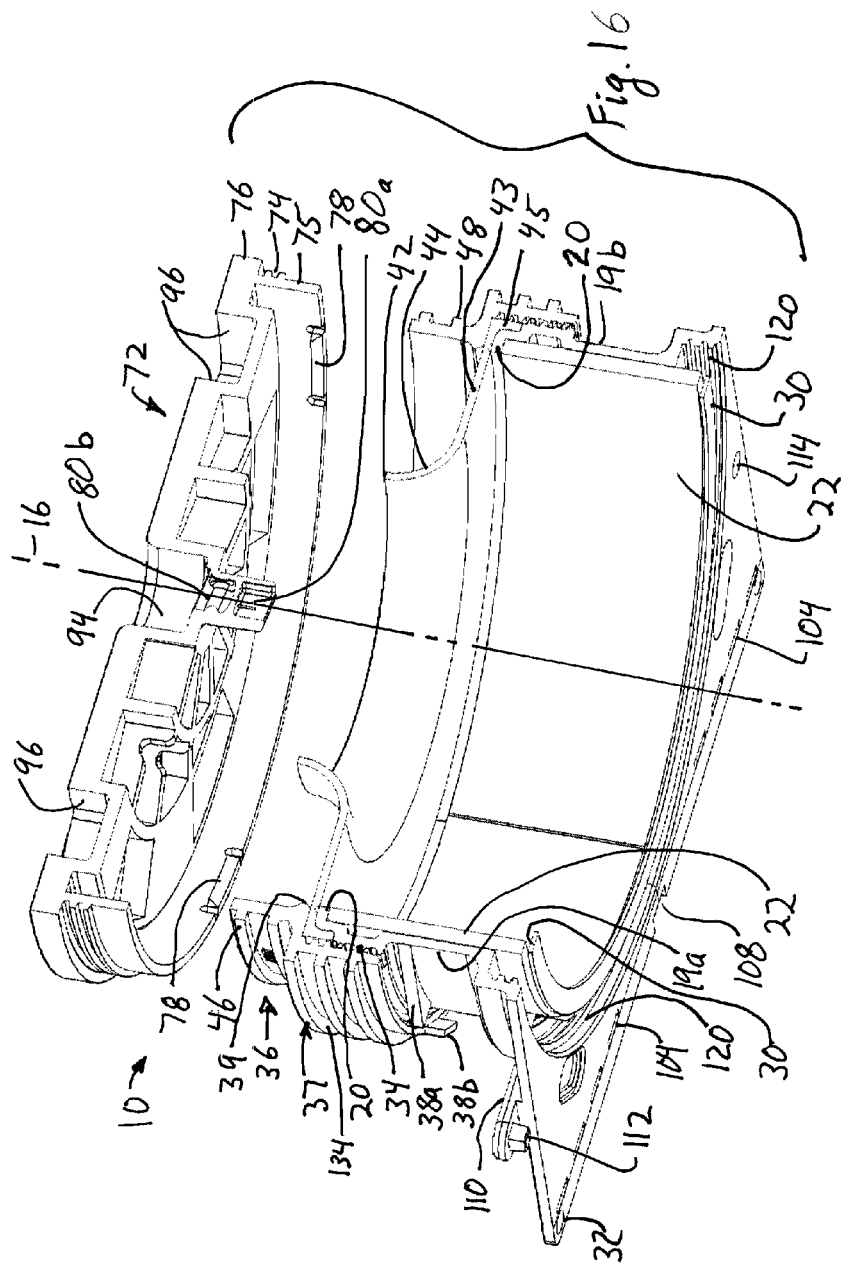
FIG. 16 is a bottom, exploded, perspective sectional view of the base and cap of FIG. 15.
Figure 17:
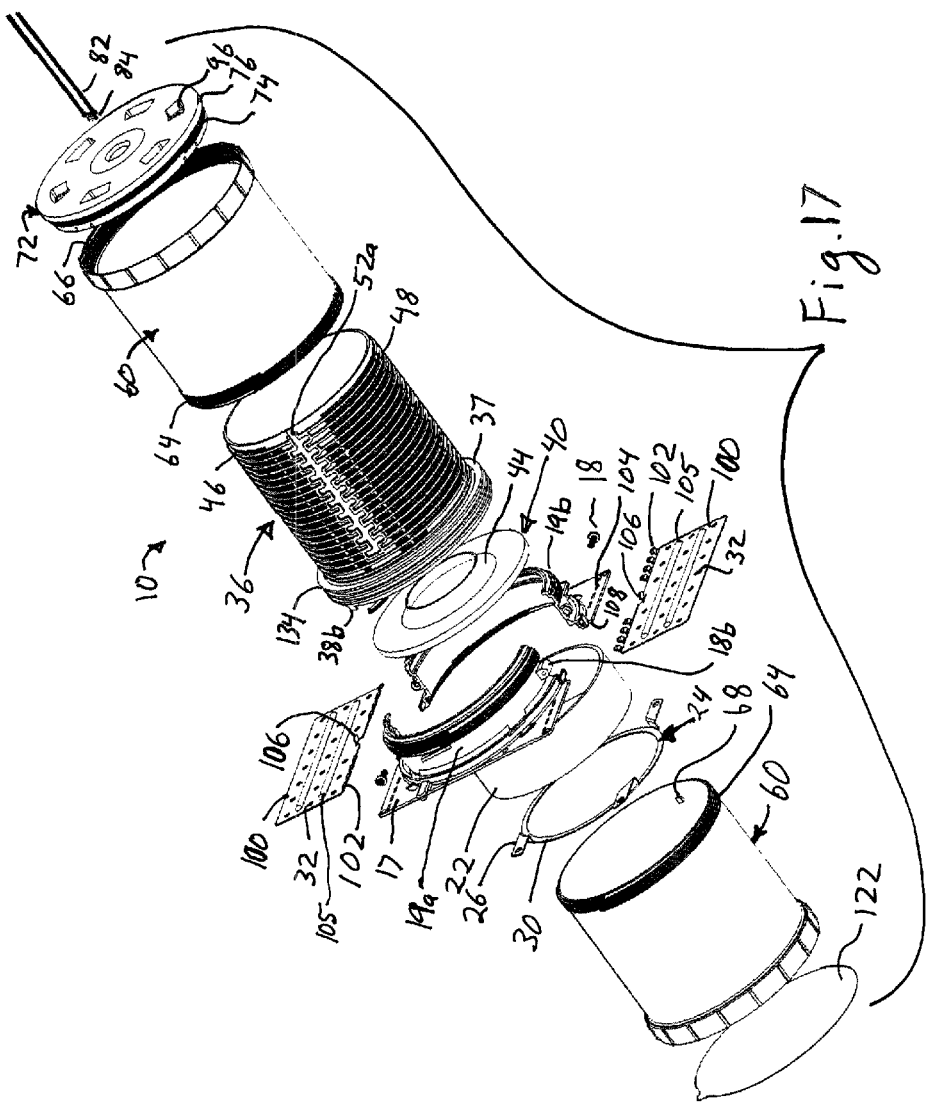
FIG. 17 is a top, exploded perspective view of a the extendable sleeve of FIG. 1 with a bottom extension tube.

But preferably a first extension tube 60 is fit over the first tube 36 and fastened thereto by lugs 70 sliding along channels 52 and rotated to engage ridges 46, 48, with cap 72 fastened to the distal end of the extension tube 60 as in FIG. 12. The filament base 84 and filament(s) 82 are preferably connected inside the assembly (FIGS. 12, 14). The open bottom in base 12 may be left open, or covered by another cap 72 or by a removable cap 122. Additional extension tubes may be shipped with this assembly. The base assembly may be shipped by itself, or shipped as a kit with the first tube 36, cap 72, cover 122, one or more extension tubes 60 and one or more (preferably 2 or 4) stabilizing plates 100, or any combinations thereof.

A user takes the assembled base 12 and verifies it is for the type of pipe intended for use with the passage assembly 10 by looking at tabs 124. The user then adjusts the first tube 36 to the desired length by cutting the tube 36 between ridges 46, 48 using the visible indicia 50 as a guide, or by adjusting the relative position of the first extension tube 60 on the first tube 36, again using visible indicia 50 as a guide. As needed, additional extension tubes 60 may be added as described above to increase the length, with the position of the first extension tube 60 relative to the first tube 36 reflecting fine adjustments on the fixed length provided by the joined extension tube(s) 60. After adjusting the length, the user fastens the base 12 to the support 33 onto which concrete is to be poured. As needed, the user may attach one or more stabilizing plates 100. Typically, fasteners such as screws (for corrugated supports 33 and nails for wooden supports 33) pass through holes 32 in the flange 17 or stabilizing plates 100 to fasten the passage tube assembly 10 to the support 33. If a corrugated support 33 is used, a hole is cut through the support 33 and the user fastens an extension tube to the bottom of base 12 by removing any protective bottom cover (e.g., cap 72 or cover 122) and then engaging threads 64 of extension tube 60 with threads 120 in the bottom of base 12 so the extension tube depends from the base 12. The end of extension tube 60 is then passed through the hole in the support 33 with the distal end of the depending extension tube 60 covered by cap 72 or cover 122, or open as the user desires. The flange 17 and/or stabilizing plates 100 are then fastened to the corrugated support 33.

Shortly before concrete is poured, the cap 72 is removed from the top end of the passage tube assembly. The base 84 and filament(s) 82 are removed from the bottom of the cap and affixed to the top of the cap 72, as shown in FIGS. 9-11, 17, 20 and 22 and the cap is then put back on the tube assembly so the locating filaments stick upward. Concrete is then poured, with the tubular passage assembly 10 forming a casing entrained in the concrete. The ridges 46a, 46b and the various projections and changes in contour on the base 12 and tubes 36, 60 help embed the parts in the concrete so as to inhibit removal. Optional ridges 134 may extend outward from the stepped portion 37 of the first tube 36 to help embed the parts in the concrete, and act as labyrinth seals against the passage of moisture between the passage tube assembly 10 and the concrete encasement. The depending extension tube 60 helps prevent the concrete from entering the tubular assembly 10 from between the top and bottom of the corrugations in the support 33.

After the concrete is finished and hardened sufficiently, the location of the passage assembly 10 may be identified by the filament(s) 82 sticking above the concrete. The cap 72 may be removed by inserting the jaws of a channel lock pliers in the wrenching recesses 96 and rotating the cap. The cover 122 or cap may be removed from the bottom of base 12 or the depending extension tube 60 fastened to the base. The workers can then pass pipes through the tubular passage assembly by passing them upwards through the opening 42 of flexible diaphragm seal 40. The flexible, funnel shaped seal 40 allows some variation in pipe diameter and location so as to make it easier for workers to install the pipes between floors and to accommodate misalignments.

The ridges 46, 48 extend radially outward from the cylindrical first tube 36. The ridges 46, 48 extend for a majority of the length of the first tube, and preferably extend the entire length or substantially the entire length of the tube from the stepped portion 37 to the upper distal end of the tube. By substantially the entire length is meant about 90 percent or more of the specified length. The ridges 46 are axially offset from the ribs 48, such that the distance between ribs 46 may be measured in inches and the distance between ribs 48 may be measured in millimeters or centimeters. The space between the adjacent ridges 46, 48 is preferably the same within both sets of ridges 46, 48. The space between the adjacent ridges 46, 48 is preferably larger than the width of the respective ribs measured along the longitudinal axis 16, with the space advantageously being about the width of a saw blade used on construction sites.

Except for the seal 40, the various other parts of the passage tube assembly 10 are preferably made of plastic, with ABS, PVC or polypropylene plastic being preferred. The extension tubes 60 and first tube 36 are preferably each about 5.5 inches long and overlap about one inch with the base 12 in releasable attachment thereto. The base 12 adds about two inches to the height of the assembly so that a base 12 and first tube 36 are about 7.5 inches from the bottom of base flange 17 to the distal end of the first tube 36, with a cap adding about ⅛ inch of additional height that is removed after concrete is poured. Adding one extension tube 60 increases the assembly height to about 12 inches from the deck or support, upon which the bottom surface of base flange 12 rests. While the extension tube 60 is about 5.5 inches long, there is about 0.5 inches of engaged threads 64, 66 on the two mating parts. Thus, the distance from the bottom of base 12 to the top of the assembly with tubes 36, 60 represents the length of the passage from the upper surface of the deck If a fire occurs, the tubular cylinder 22 of intumescent material will expand under a suitable temperature to block off air flow through the inside of the tubular passage assembly 10. If flooding occurs, the flexible diaphragm seal 40 seals against the pipe passing through opening 42 of the seal 40, with the initial water pressing the upwardly extending funnel portion 44 against the pipe so as to improve the seal and increase the weight of water needed to invert the seal and/or allow leakage past the seal.

Referring to FIGS. 27-30, the shaped diaphragm seal 40 may be used with a shortened housing to form an additional water seal module 140 suitable for attachment to the passage tube assembly 10. The diaphragm seal 40 is as previously described with shaped wall 44 defining opening 42. The diaphragm skirt 45 extends over a circular, axially extending end 142 of a connecting ring 141 having a radially outwardly extending flange 144 and may have a screw thread on the radially outward periphery of that flange 144. The diaphragm seal 40 is against which the end of the skirt 44 preferably abuts during use. The connecting ring 141 has a depending skirt 146 below the flange 144 and an optional seal retaining recess 148 immediately abutting the bottom side of the flange 144. The skirt advantageously has threads or releasable locking tabs 150 located to releasably engage the upper threads 66 on the extension tube 60 with the skirt 146 being configured to mate with the extension tube 60. The locking tabs 150 are shown as plastic tabs with a lateral latch surface resiliently urged outward to engage a mating ridge or thread on the mating part. An optional seal 152, such as an O-ring seal, may be placed in the groove 148 to form a fluid tight seal between the skirt and the adjacent portion of the extension tube 60 during use at least sufficient to exclude poured concrete and cement.

A clamping ring 154 clamps the diaphragm seal 40 between the clamping ring 154 and the connecting ring 141. The clamping ring 154 has a depending skirt 155 configured to engage the thread on the outer periphery of flange 144 and further has an inwardly extending radial flange 154 located to abut the upper surface of diaphragm seal 40 around the outer periphery of that seal during use. The clamping ring 154 has an upwardly extending skirt 158 which may have threads thereon, with interior threads being depicted in the figures. The upwardly extending skirt 158 is configured to threadingly engage cap threads 74 (FIG. 1) on cap 72 during use. Other releasable engagement mechanisms can be used, such as the resilient latch 150.

During use, the seal 40 is clamped between flanges 144, 156 of the retaining ring 141 and clamping ring 154, respectively. The mating rings 141, 154 fix the periphery of the diaphragm seal 40 while the opening 42 in the seal 40 allows a flexible fluid seal with the tubular member passing therethrough. The water seal module 140 may be affixed on the upper or lower end of the passageway 10 so as to be flush with the poured concrete and embedded therein. It provides a second water seal for redundancy. The removable cap 72 keeps debris out during pouring of concrete and is removed for insertion of the pipe etc. through the opening 42 of the diaphragm.

Figure 27:
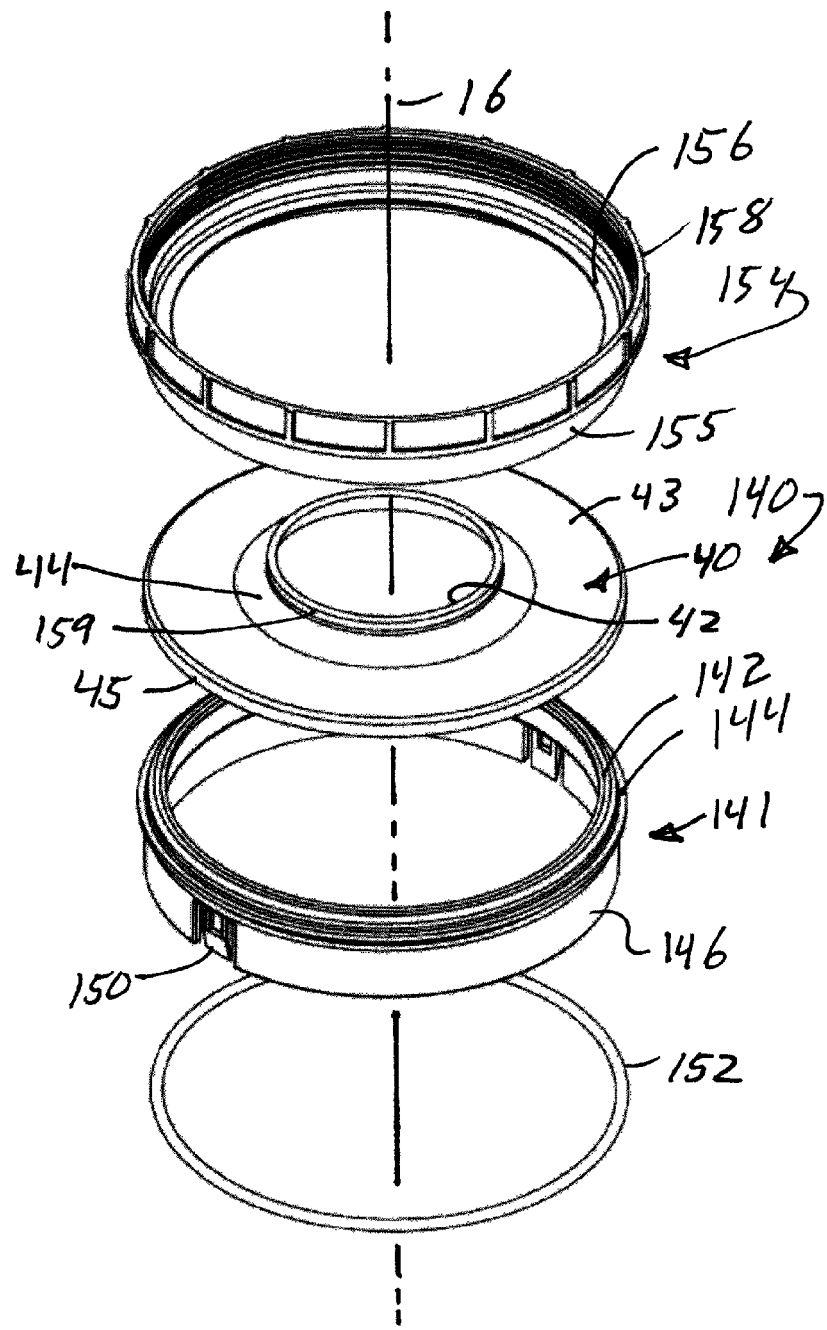
FIG. 27 is an exploded perspective view of a water seal for use with the passage tube assembly 10 of FIG. 1.

Referring to FIGS. 27 and 28, the diaphragm seal 40 is shown with an optional, axially extending rim 159. The rim 159 is integrally molded with the seal 40 and extends for a short distance along the length of the longitudinal axis 16. The rim 159 strengthens the opening 42 in the seal and helps reduce tearing and unintended enlargement of the seal. The rim also provides additional resistance to expansion and helps form a tighter seal with the elongated members passing through the seal opening 42.

Figure 33:
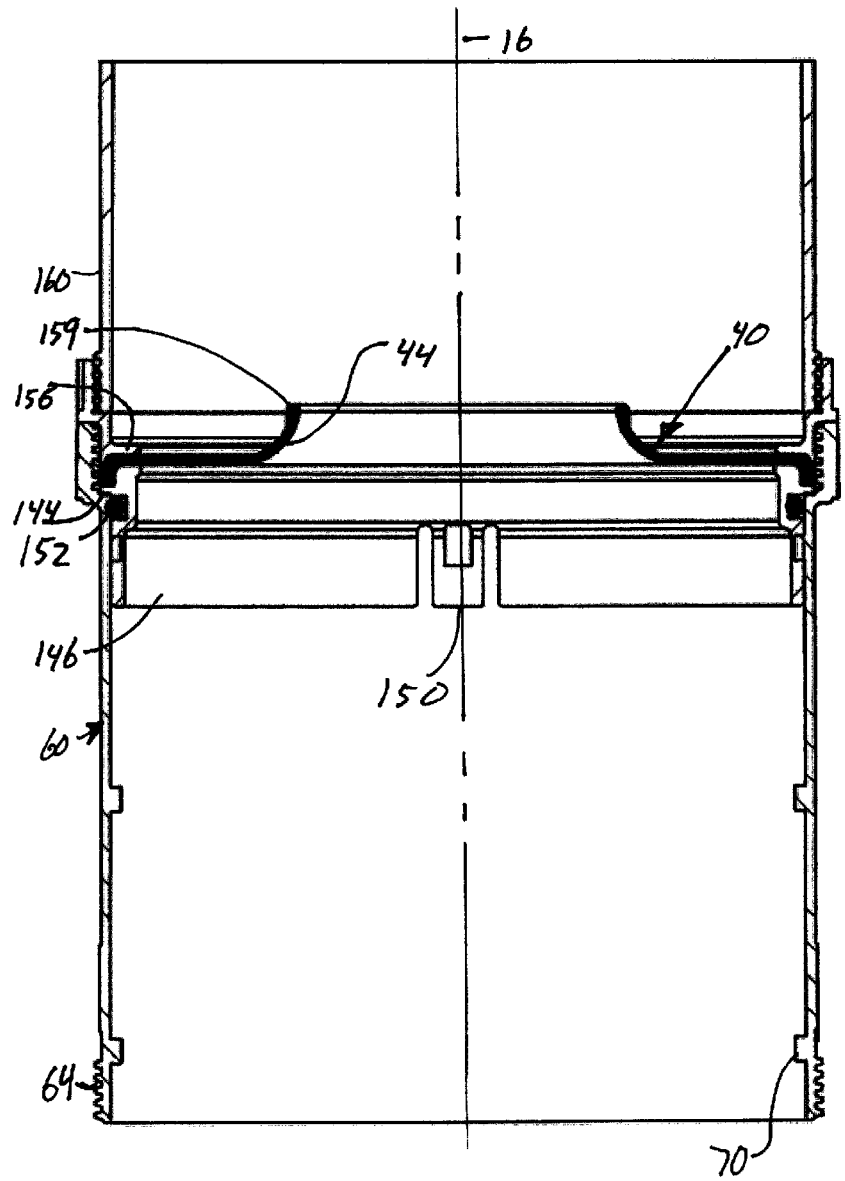
FIG. 33 is a cross-sectional view of the water dam of FIGS. 31 and 32.

Referring to FIGS. 31-33, the water seal module 140 module is connected to the end of extension tube 60 on the bottom, and connected to a dam 160 on the upper end of the module 140. The dam 160 preferably threads into the threads on the upper skirt 154 of the water module 140 to provide a tubular barrier or dam a few inches high to prevent water or debris from entering the opening formed by the extension tube 60 and other parts of the passageway 10. The dam 160 comprises a tube, preferably cylindrical and having a bottom end configured to mate with the upper end of the water module 140. The lower end of the water module 140 is shown as engaging the upper end of extension tube 60, with internal threads or other locking mechanisms configured to engage the locking tab 150 on the skirt 146 of the water module 140.

The dam 160 may have a length of a few inches, preferably about two inches and advantageously less than 6 inches. After the tubular passage 10 and/or water module 140 or extension tube 60 is embedded in a concrete floor, the cap 72 is removed and dam 160 is fastened to the upward opening end of the passageway 10, extension 60 or water module 140. Affixing the dam 160 forms a short barrier at floor level and helps prevent water and debris from easily flowing into the passageway formed by passage tube assembly 10 or water module 140. The dam 160 is short in length so that it doesn't block access to the assembly 10 and so it does not unduly hinder passing elongated members through the assembly 10 or module 140. The flange 158 may be ribbed to provide better interlocking with the concrete that embeds the flange during use, with the figures showing one exemplary ribbed design that may also provide gripping surfaces to rotate the parts during installation and use.

Referring to FIGS. 34-35, an aerator box 170 is shown in connection with the passage tube assembly 10. The aerator box 170 has two opposing, flat sides 172 spaced apart a distance that is about the same as the corresponding edges of the flange 17 on base 12 and larger than the diameter of the passageway through tube assembly 10. The flat sides 172 are each joined by an end wall 174 to encircle axis 16 and form the sides of a box enclosure with the end walls 174 being shown with a curved shape. The aerator box 170 has a top 176 joined to the top edges of sides 172 and ends 174 and having an axially extending and preferably threaded cylindrical flange 178 extending therefrom. The flange 178 is configured to fit inside and threadingly engage threads 120 on the base 12 (FIGS. 16, 20), just as extension tube 60 does. Opposite the top 176 and its flange 178, is an outwardly extending flange 180 that is connected to and preferably extends radially outward from the sides 172 and ends 174.

The sides and ends 172, 174 and top 176 form the aerator box 170 to define an enclosed space. The flange 178 connects the aerator box 170 to the base 12. The outwardly extending flange 180 allows the aerator box 170 to be fastened to a sheet or form for pouring concrete. The ends 174 are spaced further apart than sides 172, and sides 172 may be close to the outer diameter of flange 178. The extra space allowed by the larger spacing between ends 174 provides an enlarged cavity in the poured concrete to allow access and air flow to the base 12. The ends 174 are advantageously spaced a distance apart that is less than about twice the distance between sides 172. The ends 174 are preferably about 4-8 inches further apart than flat sides. That allows a space about 2 inches on opposing ends of the aerator box to accommodate hands or wrenches or air flow. Sides 172 are preferably flat so the assemblies can be placed side-by-side or ganged with minimal space usage, while ends 174 are preferably curved to reduce stress concentrations in the concrete. The junctures of sides 174 and ends 174 are preferably curved with a radius large enough to avoid high stress concentrations in the concrete slab when concrete entrains the aerator box 170.

The aerator box 170 also allows plumbing fittings, such as elbow 182 to fit further into the concrete before connecting to base 12, and that allows the pipe 184 connected to the elbow 182 to extend along and very close to the poured concrete surface without requiring an elbow fitting with unequal length legs.

Figure 36:
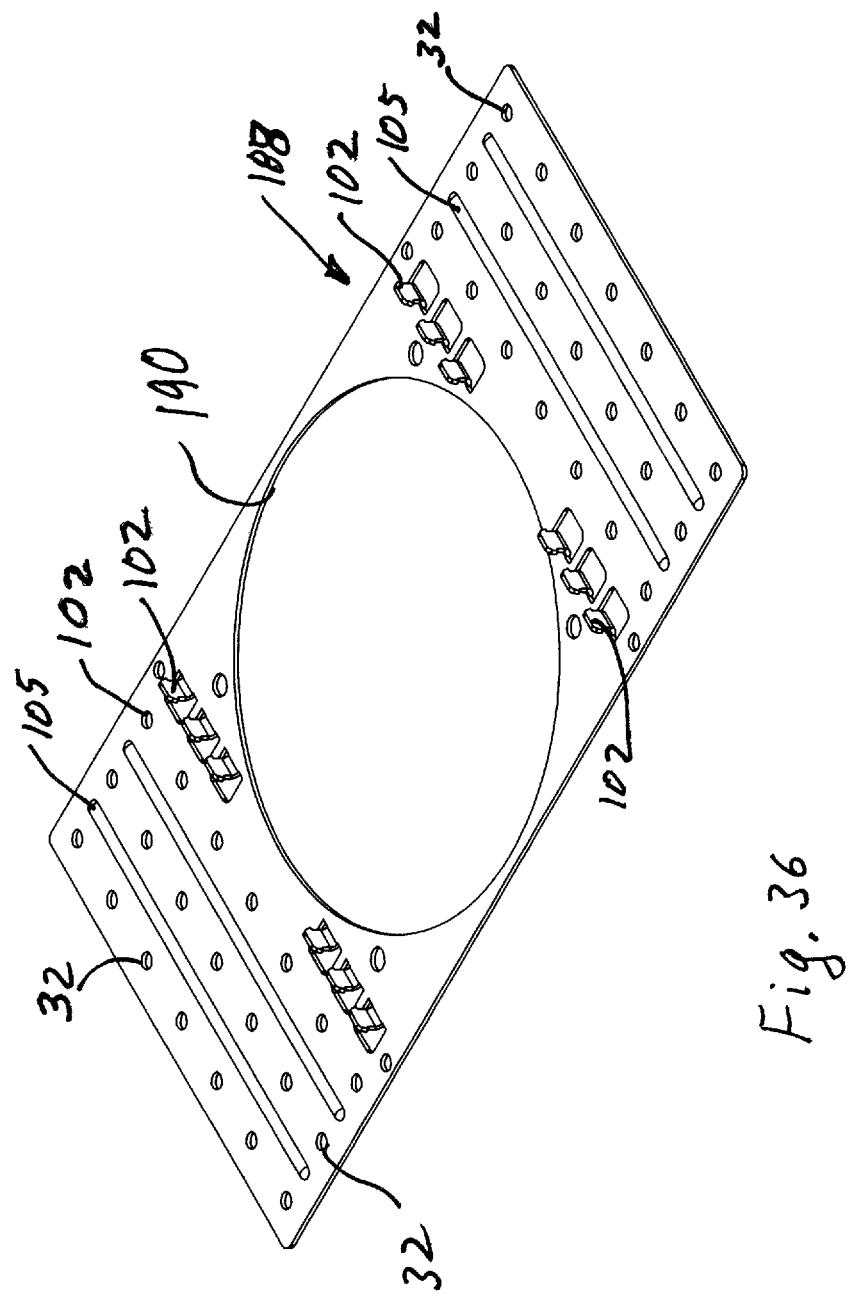
FIG. 36 is a perspective view of a further embodiment of a base flange.

Referring to FIGS. 18 and 36, in FIG. 18 the two stabilizing plates 100 were each removably attached to the flange 17 of base 12. In FIG. 36 the two stabilizing plates are integrally formed from a single piece of material, such as by punching or cutting the desired openings 32, fingers 102 and stiffening ribs 105, in order to form unitary, enlarged elongated plate 188. A circular opening 190 is formed in the plate 188. Preferably the opening 190 is about the same as the width of the plate, leaving enough structure joining the opposing ends so that the plate does not bend under its own weight during normal handling by users for installation. The opening 190 is also about the width needed to allow access to the threads 120 in the bottom of the base 12 so the extension tube 60 or elbow 182 may pass through the opening 190 to be connected to the base 12. The fingers 102 are located and configured to extend through the mating holes 104 in the flange 17 of base 12. The fingers 102 may be bent sideways or twisted to interlock the elongated plate 188 with the flange 17. In the depicted embodiment there are two rows of short, generally rectangular fingers 102, parallel to each other and aligned to mate with corresponding slots 104 in the flange 17 of base 12. If the flange 17 and base 12 are made of polypropylene or other suitably pliable material and if the fingers 102 made of metal it is believed that the flange 17 is sufficiently pliable that the fingers 102 may be forced into the flange without slots 104 in order to fasten the elongated plate 188 to the base 12 and flange 17. The forcing of the fingers 102 into the polypropylene flange 17 is facilitated if the penetrating edge of the fingers 102 is pointed or inclined.

Referring to FIGS. 37a, 37b and 37c, a further embodiment of cap 72 is shown. The cap threads 74 and skirt 75 are the same as described previously. The prior cap of FIG. 13-16 had an annular flange 76 with an outer peripheral side that was generally parallel to longitudinal axis 16 and of the same diameter as the outer periphery of the part 36, 60 with which the cap threads 74 engaged. The cap of FIGS. 37a, 37b has a top flange with an outer peripheral side 192 that is inclined inwardly to form a short, conical section that is tapered at an angle of about 23 degrees from the vertical along axis 16 and at an angle of about 67 degrees from a plane orthogonal to axis 16. The angle of inclination can vary greatly as long as the described functions are achieved, but preferably the angle is between about 45-75 degrees from the orthogonal plane and about 15-45 degrees from the axis 16. The inclined periphery 192 is located radially outward of or axially spaced apart from outward from the adjacent surface of the tube 36 or 60 with which the cap threads 74 engage. Thus, the inclined periphery 192 forms a short, conical, inclined surface in the concrete when the concrete slab is poured and entrains the sides of the cap 72 and the cap is then removed. The concrete surface is poured flush with the top of the cap 72 and the inclined periphery surface 192 forms a beveled entrance to the tubular passage 10. The inclined or beveled surface in the concrete formed by the inclined sidewall 192 angles the otherwise 90 degree, sharp corner of the prior cap, reduces stress concentration in the resulting concrete surface found at the sharp corners, and may help guide the pipe into the passageway formed by the passage 10 and/or tubes 36, 60.

After the concrete cures the cap 72 may be hit with a hammer or other device and the inclined periphery 192 more easily releases the adhesion between the cap 72 and the embedding concrete slab and thus allows the cap to be more easily removed than does a periphery of the cap 72 is concentric with the axis 16. Thus, the top outer side 192 of the cap is preferably angled inward toward the threads 74 and extends outward from the abutting body of tube 36, 60 to form a conically inclined or beveled surface in the concrete. As the outer periphery abuts the upper end of tube 36 or extension tuber 60, the cap shape may vary slightly with the nature of the juncture of those parts. The cap of FIGS. 37a, 37b has the inclined periphery surface 192 extending from the skirt 75 on which threads are formed and the length of that surface 192 preferably extends axially a distance sufficient so a portion of the inclined surface 192 extends beyond the outer diameter of the extension tube 60 in order to ensure a beveled surface is formed in the concrete. As shown in FIG. 37c, the inclined surface 192 is spaced radially outward from the skirt 75 on which the threads 74 or other engaging mechanism are located and spaced outward a distance about the same as the thickness of the extension tube 60 which is sufficient to allow the inclined side 192 to form a beveled opening to the concrete surface when the sidewall 192 is entrained with concrete to the level of the top of the cap 72. In FIG. 37c, there is an annular, axial facing surface at the bottom of the inclined surface 192 which preferably places the bottom of the inclined surface at the outer periphery of the extension tube 60 when the cap is fastened to the upper end of that extension tube for entrainment in concrete.

Figure 38B:
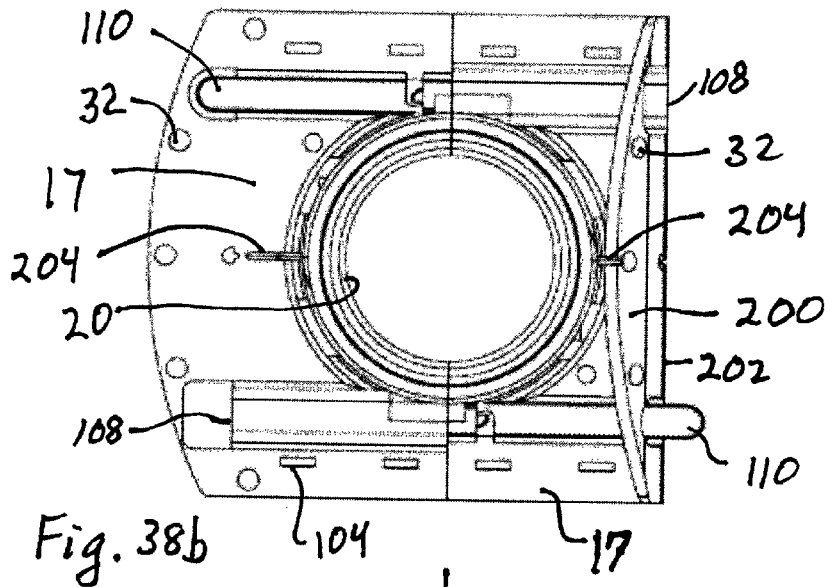
FIG. 38b is a top view of the base of FIGS. 38a and 38c.
Figure 38C:
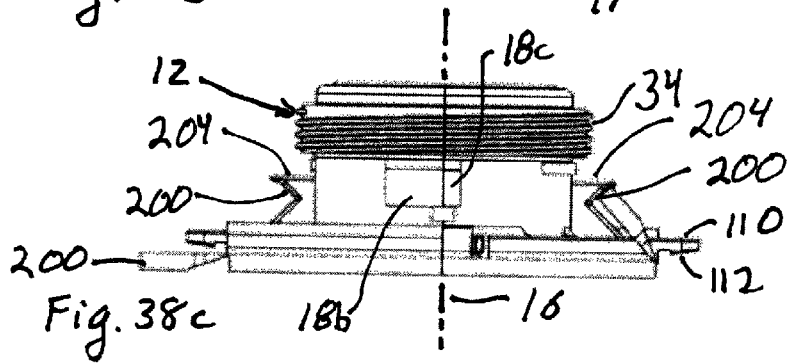
Figure 38D:
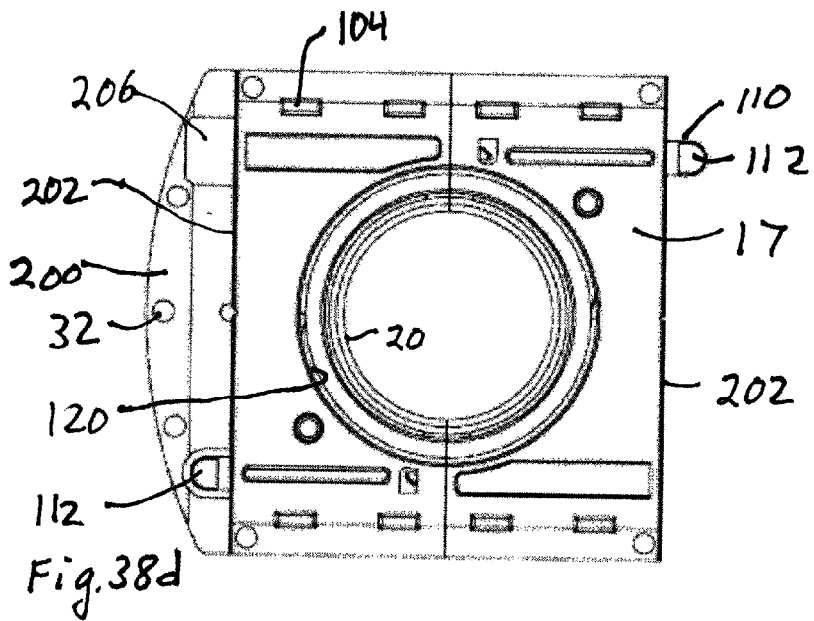
FIG. 38d is a bottom view of the base of FIGS. 38a and 38c.

Referring to FIGS. 38a-38d, an alternative embodiment of the base 12 and its flange 17 and stabilizing plate 100 is shown. The split, two part base 12 with its associated and flange(s) 17 are substantially as previously described and held together by fasteners 18a engaging bosses 18b and 18c. But the flange 17 is modified. The distal end portion of at least one, and preferably of two opposing sides of the base flange 17 may be elongated to form a supporting plate 200 that is connected to the flange 17 so the supporting plate 200 may fold upward toward and preferably connected to sidewall 19 of base 12. A hinge 202 allows the rotation of the supporting plate(s) 200 with the portion outward of the hinge 202 forming the supporting plate 200 or distal end portion. Preferably a living hinge 202 may be used and it may be formed by molding, scoring, cutting or otherwise forming a sharply reduced cross section in the thickness of the flange 17 to define a weakened line 202 which may bend and form a living hinge 202. The hinge 202 is preferably formed in the bottom surface of the flange 17 (FIG. 38d). More preferably the base 12, flange 17 and supporting plate(s) 200 are injection molded plastic to form a unitary, integrally molded part, that is formed at the same time, with a reduced area forming the living hinge 202. The living hinge 202 preferably extends from side to side across flange 17 and has a width that is less than the thickness of the flange 17 at the location of the hinge 202. Advantageously, the depth of the groove forming the living hinge 202 is less than half the thickness of the flange 17 at the location of the hinge 202. The material of the flange 17 is also appropriately selected to allow repeated bending of the supporting plate 200 about hinge 202 without fracturing after being fully flexed 5-10 times. A polymer material is preferred, with polypropylene being believed suitable. In a less preferable embodiment the material of flange 17 and the groove forming hinge 202 are selected of a more brittle material or material susceptible to fatigue failure so that the groove forming hinge 200 forms a frangible line allowing supporting plate 200 to be broken off along the hinge 202 by fully flexing the hinge 202 a few times, preferably less than five times and more preferably 2 or three times.

When in the deployed position substantially in the plane of flange 17 the supporting plate(s) 200 extend the supporting flange 17 over a larger area and preferably over abutting or adjacent corrugations 33 (FIG. 22). By forming a living hinge, the flange 17 is relatively stiff unless and until the supporting plates are first rotated about hinge 202 and that makes handling easier. The supporting plates 200 may have fastener openings 32 therein so the plates 200 may be fastened to the concrete forms and such fastening greatly stiffens the flange 17 and plates 200 until concrete is poured over the assembly. If space is tight or if one or more passage tube assemblies 10 are ganged together adjacent one another, then the extended supporting plates 200 are undesirable. Rotating the supporting plates 200 about hinge 202 effectively takes them out of the way to allow close nesting and ganging of the bases 12 and passage tube assemblies 10. By having the hinges 202 connect the supporting plates 200 the complexity of handling multiple parts is avoided and the risk that the detachable supporting plates 100 will be lost or not readily available when needed is also avoided.

The supporting plate(s) 200 may be rotated about living hinge 200 toward base 12 sidewall 19 of the base 12 with a latch 204 (FIG. 38c) extending outwardly from the sidewall 19a or 19b to releasably engage the adjacent supporting plate 200, usually at an edge of the plate or at an opening formed in the plate 200 at a location to be engaged by the latch 204, or by a mating latching surface connected to the plate and located to be engaged by the latch 200—depending on the length of the plate 200. In the depicted embodiment the latch 204 is a planar flange extending vertically in a radial plane and having a right-angled notch in it (FIG. 38a, 38c) so the supporting plate 200 may rest against the lower, inclined portion of the notch and limit the rotation of the plate toward the base 12, while the upper and outer edge of the notch latches the plate 200 into position. An elongated latching member or beam latch 204 lacking any rotation stop, is also believed suitable.

Preferably there are two hinges 202, located on opposing sides of the sidewall 19, and spaced apart the same distance as the two adjacent sides of the flange 17 so as to form a square flange 17 when the supporting plates 200 are latched to the sidewalls 19a, 19b by the latches 204. In the depicted embodiment the supporting plates 200 have a length measured outward of the hinge 202 that is about half the height of the base 12 measured along axis 16—as best seen in FIG. 38c. But the length of supporting plates 200 may vary, with the location of the latch 204 varying as needed to hold the plate 200 in a non-deployed position, or with various latching surfaces, edges or openings being formed in the plates 200 to engage latches 204 extending from the base 12.

FIGS. 33a-33d also show the connecting latches 110 and latch ends 112 and latch recesses 108. The rotation of the supporting plate 200 about hinge 202 would hit the latch 110, so an opening 206 is formed in the latch plate 200 to accommodate passage of latch 110 through the supporting plate 200 as the plate is rotated toward base 12 about hinge 202. Likewise, an opening 206 in the supporting plate 200 allows the latch 110 to engage the recess 108 in the mating part.

Figure 39:
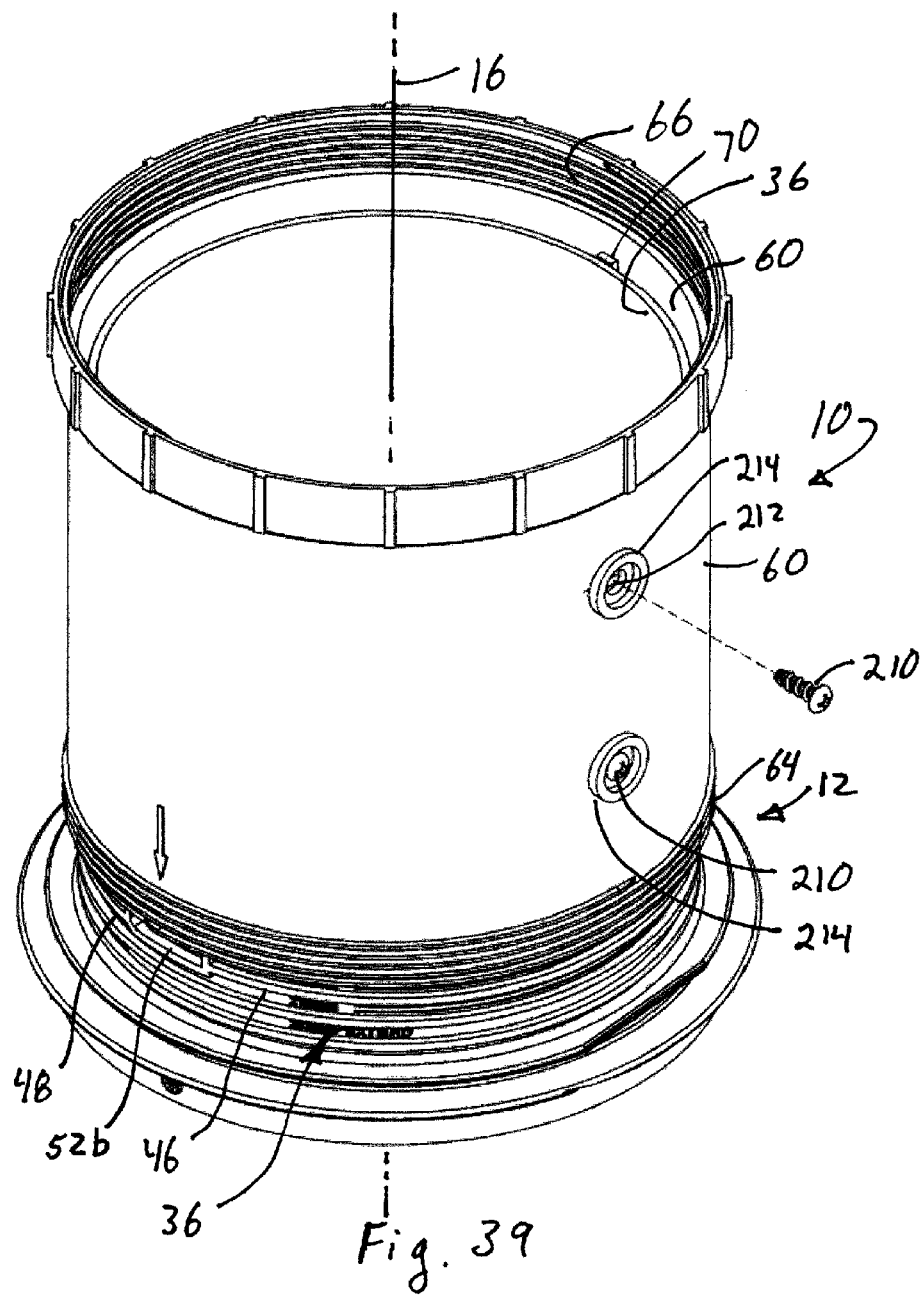
FIG. 39 is a perspective view of a passage tube assembly with threaded fasteners extending into ports to lock parts together.

Referring to FIG. 39, a passage tube assembly 10 is shown having a base 12, a first tube 36 and an extension tube 60. The first tube 36 has first and second sets of ridges 46, 48 on tube 36 which ridges are separated by corresponding grooves formed by the adjacent ridges 46 or adjacent ridges 48. The ridges and grooves are located at predetermined locations along the axial length of the first tube 36. The extension tube 60 is located coaxial with and outside of the inner, first tube 36. At least one, and preferably pairs of threaded fasteners 210 extend through the outer tube 60 and into the inner tube 36, preferably at a location of one of the grooves between adjacent ridges 46, or adjacent ridges 48. A pilot hole 212 may extend at least part way through the wall of the outer extension tube 60, with the pilot hole preferably located in a boss 214 that may be molded into the side of the tube 60. Advantageously the pilot hole 212 does not extend all the way through the wall of outer, extension tube 60 and ends with about 0.02 or 0.03 inches of wall thickness remaining. The pilot hole 212 thus dead ends within the wall of tube 60 to form a blind hole 212. The pilot hole 212 is preferably slightly smaller than the outer diameter of the threaded portion of fasteners 210. If the material of the tubes 36, 60 is sufficiently flexible, the threaded fastener 210 may be much larger than the pilot hole 212 without breaking the tubes as the fastener is inserted.

The pilot holes 212 are located at predetermined along the axial length of the tube 60 which locations are selected to coincide to place the fasteners 210 between adjacent ridges 46 or adjacent ridges 48. The threaded fasteners 210 are preferably self-taping or self-drilling screws of a material suitable for use with concrete and the material of the tubes 36, 60, and are preferably of steel or stainless steel. Once the length of the tube 36 and outer tube 60 are selected to place the top of the passageway 10 at the desired location of the concrete surface within which the passageway 10 will be embedded, the screws 210 are driven through the blind end of the pilot hole 212 in outer tube 60, across any gap separating the tubes 36, 60, and into the wall of the inner tube 36 so as to secure the two tubes 36, 60 together. Preferably pilot holes 212 are located on diametrically opposing sides of tube 60 and preferably there are two pilot holes 212 vertically aligned along an axis parallel to axis 16, on each opposing side of tube 60. The fasteners 210 guard against unintended changes in the length of the passage tube assembly 10 during construction. A fastener 210 on each opposing side helps avoid tilting of the outer tube 60 relative to the inner tube 36 and helps maintain the cap 72 parallel to the desired exterior surface of the concrete within which the passage tub assembly 10 is to be embedded. A pair of fasteners 210 are preferably used on each side to prevent tilting about a plane through axis 16 and containing the fasteners 210, and to make the position and configuration of the passage tube assembly 10 more stable.

Because the locking lugs 68, 70 on the extension tube 60 position the tube 60 relative to the inner, graduated tube 36, the relative location of the two tubes 36, 60 are known, and thus the location of the ridges 46, 48 relative to a point on the outer surface of tube 60 is also known or determinable. The location of the pilot holes 212 relative to the ridges 46, 48 may thus be determined. The pilot holes 212 may thus be located so that the threaded fasteners 210 extend between adjacent ridges 46 or through them, or between adjacent ridges 48, or through them. Advantageously the threaded fasteners 210 comprise self-taping screws with an outer thread diameter larger than the space between two adjacent ridges 46 or two adjacent ridges 48 and the pilot holes 212 are located so the fasteners pass between those two adjacent ridges and threadingly engage two adjacent ridges 46 or two adjacent ridges 48. The bosses 214 are optional, but make it easier to locate the pilot holes 212. A boss 214 with an annular outer rim surrounding a recessed inner surface centered around pilot hole 212 is preferred.

The tube 36 thus has a plurality of first ridges 46 that are equally spaced apart a distance sufficient to snugly receive one of locking lugs 68, 70 on the extension tube 60, and preferably has a plurality of second ridges 48 also equally spaced apart a distance sufficient to snugly receive one of locking lugs 68, 70, with the first set of ridges 46 axially offset from the second set of ridges 48. The pilot hole(s) 212 may be located relative to the received locking lug 68, 70 so as to be located in a radial plane passing between two adjacent first ridges 46 when one of the locking lugs 68, 70 is received between two first ridges 46, and preferably located in the middle of two such adjacent first ridges. The pilot hole(s) 212 may also advantageously located relative to the received locking lug 68, 70 so as to be located in a radial plane passing between two adjacent second ridges 48 when one of the locking lugs 68, 70 is received between two first ridges 46, and preferably located in the middle of two such adjacent first ridges.

Referring to FIGS. 40-41, the extension tube 60 may have stiffening ribs in order to increase the strength of the passage tube assembly. The tube 60 may thus have circumferential ring stiffening rings 220 located along the axial length of the tube 60, or it may have longitudinal stiffeners 222 extending parallel to the longitudinal axis 16 along the axial length of the outer surface of the tube 60. The stiffeners 220, 222 extend outward from the exterior or outer surface of tube 60 and may extend radially outward and are preferably of the same cross-sectional shape. The stiffeners 220, 222 may have various cross-sectional shapes but preferably a cross-sectional shape is selected that allow the stiffeners 220, 222 to be molded by a two-part mold with a vertical mold separation line.

Depending on the strength desired for the tube 60, the stiffeners 220, 222 may have various shapes and various numbers of rings or stiffeners. For stiffening rings 220, the cross-section is smaller at the outermost end and wider at the innermost end which joins the outer surface of the tube and shapes having slightly rectangular cross-sections or semi-circular cross sectional shapes are believed desirable, and the cross-sectional shapes are preferably solid.

For longitudinal stiffeners 222 the orientation of the stiffeners preferably alters to accommodate a two part mold, with each longitudinal stiffener or stiffening rib 224 having a height extending along an axis parallel to the axis 144 (FIG. 41) along which the mold is withdrawn, with the molds separating along mold separating line 225. Thus, as seen in FIG. 41, the longitudinal stiffeners 222 on opposing sides of bosses 214 are almost radial in orientation while the rigs 90 degrees thereto are radial in orientation, but the ribs in-between become more tangential or inclined since the rib height is parallel to the axis 224. The depicted ribs 224 thus have a varying actual height but preferably do not extend outward beyond the radial outward diameter of the flange having internal threads 66. The longitudinal ribs 224 may be about 0.1 inch to ⅛ inch wide with the height varying as described. On the inside of the extension tube 60 of FIG. 41 are shown some slightly raised longitudinal bosses 226 that are added for molding convenience. The bosses 226 are about 0.02 inches high for a tube 60 that is about 4.5 to 5 inches in diameter as shown in FIGS. 40-41.

The stiffeners 220, 222 allow greater load to be carried along the axis 16 and to accommodate that increased load the various threads 16, 35, 64, 66 may be buttress threads, or ACME threads or other type of power threads in order to carry the increases axial forces without shearing off or breaking the threaded connections among the parts. The threads are preferably integrally molded with the various parts (base 12, tube 36, tube 60) and are thus of the same type of material, preferably plastic, as the various parts. But the threads 16, 35, 64, 66 could be made of metal and either over-molded into parts made of plastic such as base 12, tube 36 or tube 60, or otherwise secured in the plastic part. There are thus provided circumferential stiffening ribs 220 or longitudinal stiffening ribs 222 to strengthen the extension tube 60.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious, modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An assembly forming a tubular passage for poured concrete decks formed on a support surface, comprising:

a base having a cylindrical sidewall with an upper end and an opposing lower end and extending along a longitudinal axis, the upper end of the base's sidewall having an inward extending upper flange defining a circular opening, the lower end of the base having an outward extending base flange to support the base on the support surface during use;

a tubular cylinder of intumescent material fitting inside and adjacent to the base's sidewall and restrained from movement in a first direction along the longitudinal axis by the upper flange, the tubular cylinder of intumescent material encircling the longitudinal axis and retained in position along the longitudinal axis during use;

a first flexible diaphragm seal having an outer periphery engaging an upper end of the base and having an inner periphery defining an opening encircling the longitudinal axis during use, a portion of the diaphragm adjacent the inner periphery having a funnel shape extending out of a plane orthogonal to the longitudinal axis through the outer periphery;

a first tube having opposing upper and lower ends with the lower end configured to engage the base, the first tube having an inward extending flange adjacent the lower end configured to engage the periphery of the diaphragm and press it against the base to form a fluid tight seal when the first tube is engaged with the base, the first tube further including a first set of parallel ridges extending outward from the first tube with each of the ridges in a plane orthogonal to the longitudinal axis and spaced apart a first distance;

a first extension tube having a sidewall with opposing top and bottom ends, the bottom end of the first extension tube having first and second locking lugs each extending inward from a different opposing side of the first extension tube, with rotation of the first extension tube placing each locking lug between two adjacent ridges of the first set of ridges when the first extension tube is centered on the longitudinal axis and overlaps a portion of the first tube, the first extension tube having ring stiffening ribs or longitudinal stiffening ribs on an outer side of the first extension tube;

a pilot hole extending partially through the sidewall of the extension tube from an exterior side of the first extension tube, the pilot hole located relative to one of the first and second locking lugs so that the pilot hole is located in a radial plane passing between two adjacent first ridges.

2. The assembly of claim 1, wherein there are two pilot holes on opposing sides of the first extension tube and further comprising two threaded fasteners, each extending through a different one of the pilot holes and wall of the extension tube and into the first tube between two adjacent first ridges to connect the first extension tube to the first tube, and further comprising two self-tapping threaded fasteners each extending through a different one of the pilot holes and wall of the extension tube and into the first tube between two adjacent first ridges to connect the first extension tube to the first tube.

3. The assembly of claim 1, wherein the first set of ridges extends less than half way around the first tube and further comprising a second set of parallel ridges extending outward from the first tube with each of the ridges in a plane orthogonal to the longitudinal axis, the second set of ridges each extending less than half way around the first tube and located on an opposing side of the first tube than the first set of ridges, the first and second ridges having ends spaced apart to define first and second longitudinal channels on opposing sides of the first tube.

4. The assembly of claim 1, further comprising a second flexible diaphragm seal having a circular periphery located between a connecting ring and a clamping ring and held therebetween, the second diaphragm seal having an inner periphery defining an opening encircling the longitudinal axis during use, a portion of the diaphragm adjacent the inner periphery having a funnel shape extending out of a plane orthogonal to the longitudinal axis through the outer periphery and extending in the same axial direction as the funnel shape of the first diaphragm, the connecting ring being configured to engage the upper end of the first tube.

5. The assembly of claim 4, wherein the connecting ring has threads or a snap lock to engage the upper end of the first tube, with an O-ring seal located between an outward facing surface of the connecting ring and an inner surface of the first tube, the O-ring seal located between the first and second diaphragm seals.

6. The assembly of claim 4, wherein the cap further comprises:

a circular top having opposing upper and lower surfaces with a depending skirt and an inclined sidewall located between the depending skirt and a top surface of the cap, the inclined sidewall having a larger diameter adjacent the top surface of the cap and a smaller diameter adjacent the skirt, the inclined sidewall having a diameter larger than an outer diameter of the top end of the first extension tube so as to extend outward of the first extension tube and form a beveled surface in concrete entraining the cap and first extension tube during use.

7. The assembly of claim 6, wherein the skirt has one of latches or threads located and configured to releasably fasten the cap to the upper end of the first tube or the first extension tube; and further comprising:

a mount on at least an upper side of the top, the mount located in a recess; and a connector having at least one filament extending therefrom, the connector configured to releasably engage the mount to hold the at least one filament generally parallel to the longitudinal axis, the engagement of the filament to the connector being located below the upper side of the top and sufficiently far from the recess so that the at least one filament can be troweled against the upper side of the top and not break, the filament having a length sufficient to be visible after the cap is covered with a thin layer of troweled concrete during use.

8. The assembly of claim 4, wherein the connecting ring has threads or a snap lock to engage the upper end of the first tube, with an O-ring seal located between an outward facing surface of the connecting ring and an inner surface of the first tube, the O-ring seal located between the first and second diaphragm seals.

9. The assembly of claim 1, further comprising an aerator box having two parallel side walls joined at opposing ends to a different one of two opposing end walls, the side walls and end walls connected to a top having a cylindrical flange configured to connect to the bottom of the base, the parallel side walls being spaced apart the same distance as two opposing sides of the base flange, the two opposing end walls being spaced apart a larger distance but less than twice the distance between the parallel side walls, at least some of the end walls and side walls having a lower end with an outwardly extending flange suitable for fastening the aerator box to a concrete pouring form.

10. The assembly of claim 1, wherein the base flange has two opposing and parallel sides and two opposing ends, each of the opposing ends having a hinge extending across the end orthogonal to the sides and forming a distal end portion that may rotate about the hinge toward the sidewall of the base.

11. The assembly of claim 10 wherein the hinge is a living hinge formed in a base flange made of a polymer.

12. The assembly of claim 10, further comprising a ring having a short axial width of a few inches and having a circular connector configured to sealingly engage the upper end of the first tube or the first extension tube to form a dam after the assembly is encased in concrete.

13. The assembly of claim 1, further comprising a support plate having an opening encircling the longitudinal axis and allowing access to the bottom of the base, the support plate having a length sufficient to extend beyond the ends of two opposing ends of the base flange, the support plate having a generally planar shape with a plurality of fingers extending from an upper surface of the plate, the fingers configured to pierce the base flange and connect the support plate to the base flange.

14. The assembly of claim 1, further comprising a support plate having an opening encircling the longitudinal axis and allowing access to the bottom of the base, the support plate having a length sufficient to extend beyond the ends of two opposing ends of the base flange, the support plate having a generally planar shape with a plurality of fingers extending from an upper surface of the plate, a plurality of the fingers configured and located to extend through a plurality of slots extending through the base flange to connect the support plate to the base flange.

15. The assembly of claim 1, wherein the stiffening ribs comprise ring stiffeners.

16. The assembly of claim 1, wherein the first tube includes first and second channels facing outward and each extending along a different, opposing side of the first tube and along a direction generally parallel to the longitudinal axis, the first and second lugs being sized and located to slide along the first and second channels when the first extension tube is centered on the longitudinal axis and overlaps a portion of the first tube.

\* \* \* \* \*